United States Patent
Chang et al.

(10) Patent No.: US 11,107,027 B1
(45) Date of Patent: Aug. 31, 2021

(54) EXTERNALLY AUGMENTED PROPENSITY MODEL FOR DETERMINING A FUTURE FINANCIAL REQUIREMENT

(71) Applicants: Eva Diane Chang, Mountain View, CA (US); Madhu Shalini Iyer, Fremont, CA (US); Jeffrey Lewis Kaufman, Mountain View, CA (US)

(72) Inventors: Eva Diane Chang, Mountain View, CA (US); Madhu Shalini Iyer, Fremont, CA (US); Jeffrey Lewis Kaufman, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 936 days.

(21) Appl. No.: 15/169,718

(22) Filed: May 31, 2016

(51) Int. Cl.
| | | |
|---|---|---|
| *G06Q 40/00* | (2012.01) | |
| *G06Q 30/02* | (2012.01) | |
| *G06Q 10/06* | (2012.01) | |
| *G06Q 40/02* | (2012.01) | |

(52) U.S. Cl.
CPC ........ *G06Q 10/067* (2013.01); *G06Q 30/0202* (2013.01); *G06Q 40/025* (2013.01); *G06Q 40/12* (2013.12); *G06Q 30/0282* (2013.01)

(58) Field of Classification Search
None
See application file for complete search history.

(56) References Cited

U.S. PATENT DOCUMENTS

| | | |
|---|---|---|
| 7,668,776 B1 | 2/2010 | Ahles |
| 7,954,698 B1 | 6/2011 | Pliha |
| 8,180,713 B1 * | 5/2012 | Rigby .................. G06Q 40/06 706/12 |
| 8,538,840 B2 | 9/2013 | Chan et al. |
| 8,751,273 B2 | 6/2014 | Pinto et al. |
| 9,213,990 B2 | 12/2015 | Adjaoute |
| 9,471,729 B1 | 10/2016 | Terry et al. |

(Continued)

OTHER PUBLICATIONS

A. Çaliş, A. Boyaci and K. Baynal, "Data mining application in banking sector with clustering and classification methods," 2015 International Conference on Industrial Engineering and Operations Management (IEOM), 2015, pp. 1-8 (Year: 2015).*

(Continued)

*Primary Examiner* — Rutao Wu
*Assistant Examiner* — Sarjit S Bains
(74) *Attorney, Agent, or Firm* — Ferguson Braswell Fraser Kubasta PC

(57) ABSTRACT

A method for utilizing an externally augmented propensity model for determining a future financial requirement. The method includes obtaining at least one propensity model that models how data associated with a business entity relates to a future financial requirement of the business entity, and gathering the data associated with the business entity. The data includes a first portion created based on a platform utilized by users associated with the business entity, and financial data of an owner of the business entity. The data matches at least a subset of the at least one propensity model. The business entity is scored by applying the at least one propensity model to the data. Further, based on the score, the future financial requirement of the business entity is classified. Still yet, a message is transmitted to the business entity based on the classification of the future financial requirement of the business entity.

18 Claims, 10 Drawing Sheets

(56) References Cited

U.S. PATENT DOCUMENTS

| | | | |
|---|---|---|---|
| 9,721,296 | B1 | 8/2017 | Chrapko |
| 2002/0002520 | A1 | 1/2002 | Gatto |
| 2002/0152148 | A1 | 10/2002 | Ebert |
| 2002/0165743 | A1* | 11/2002 | Dahl-Sorensen ............ G06Q 10/06375 705/7.29 |
| 2002/0198822 | A1 | 12/2002 | Munoz et al. |
| 2003/0172084 | A1 | 9/2003 | Holle |
| 2004/0030667 | A1 | 2/2004 | Xu et al. |
| 2004/0133439 | A1 | 7/2004 | Noetzold et al. |
| 2007/0016501 | A1* | 1/2007 | Chatterji ............ G06Q 10/063 705/35 |
| 2007/0016542 | A1* | 1/2007 | Rosauer ............ G06N 5/022 706/21 |
| 2007/0050201 | A1 | 3/2007 | Gardner et al. |
| 2007/0067208 | A1* | 3/2007 | Haggerty ............ G06Q 40/00 705/36 R |
| 2007/0067209 | A1* | 3/2007 | Haggerty ............ G06Q 40/00 705/35 |
| 2007/0078741 | A1* | 4/2007 | Haggerty ............ G06Q 40/00 705/36 R |
| 2007/0226099 | A1* | 9/2007 | Senturk-Doganaksoy ............ G06Q 40/00 705/35 |
| 2007/0265907 | A1 | 11/2007 | Adduci et al. |
| 2008/0228541 | A1* | 9/2008 | Megdal ............ G06Q 10/0637 705/7.33 |
| 2008/0228606 | A1* | 9/2008 | Megdal ............ G06Q 40/02 705/30 |
| 2009/0132448 | A1 | 5/2009 | Eder |
| 2010/0049647 | A1* | 2/2010 | De Chabris ............ G06Q 40/04 705/37 |
| 2010/0057548 | A1 | 3/2010 | Edwards |
| 2011/0047072 | A1 | 2/2011 | Ciurea |
| 2012/0078766 | A1 | 3/2012 | Rose et al. |
| 2012/0109710 | A1 | 5/2012 | Rahman et al. |
| 2012/0246048 | A1 | 9/2012 | Cohen et al. |
| 2012/0278767 | A1 | 11/2012 | Stibel et al. |
| 2013/0006825 | A1 | 1/2013 | Robida et al. |
| 2013/0041781 | A1 | 2/2013 | Freydberg |
| 2014/0214482 | A1 | 7/2014 | Williams et al. |
| 2014/0258094 | A1* | 9/2014 | Jouhikainen ............ G06Q 40/08 705/38 |
| 2014/0270779 | A1 | 9/2014 | Lee et al. |
| 2014/0279452 | A1 | 9/2014 | Hitchmoth |
| 2014/0289096 | A1* | 9/2014 | Montgomery ............ G06Q 40/04 705/37 |
| 2015/0006294 | A1 | 1/2015 | Irmak et al. |
| 2015/0112854 | A1* | 4/2015 | Guriel ............ G06Q 40/025 705/38 |
| 2015/0134449 | A1 | 5/2015 | Gorelov et al. |
| 2015/0220999 | A1 | 8/2015 | Thornton et al. |
| 2015/0324715 | A1 | 11/2015 | Nelson et al. |
| 2016/0048766 | A1 | 2/2016 | McMahon et al. |
| 2016/0063545 | A1 | 3/2016 | Deng |
| 2016/0070908 | A1 | 3/2016 | Sanghvi et al. |
| 2017/0032386 | A1 | 2/2017 | Borza |
| 2017/0206365 | A1 | 7/2017 | Garcia et al. |
| 2017/0213280 | A1 | 7/2017 | Kaznady |
| 2017/0244796 | A1 | 8/2017 | Liu et al. |
| 2017/0308958 | A1 | 10/2017 | Rieth et al. |
| 2017/0308960 | A1 | 10/2017 | Mascaro et al. |
| 2018/0114128 | A1* | 4/2018 | Libert ............ G06N 5/045 |

OTHER PUBLICATIONS

Jain, K.K ; Gupta, P.K ; Mittal, Sanjiv, "Logistic Predictive Model for SMEs Financing in India", Vision (New Delhi, India), 2011-12, vol. 15 (4), p. 331-346 (Year: 2012).*

International Search Report and Written Opinion in related International Application No. PCT/US2017/028476 dated Jun. 28, 2018 (10 pages).

International Preliminary Report on Patentability issued in application No. PCT/US2017/028476 (6 pages).

International Search Report and Written Opinion of the International Searching Authority issued in application No. PCT/US2017/029745 (10 pages).

International Preliminary Report on Patentability issued in application No. PCT/US2017/029745 (8 pages).

International Search Report and Written Opinion of the International Searching Authority issued in application No. PCT/US2017/033148 (9 pages).

International Preliminary Report on Patentability issued in application No. PCT/US2017/033148 (7 pages).

Woodie, Alex, "How Intuit Personalizes Turbo Tax Experiences with Big Data"; Datanami (https://www datanami.com); Apr. 15, 2016 (3 pages).

Chen et al., "Financial Characteristics Corporate Governance and the Propensity to Pay Cash Dividends of Chinese Listed Companies", published in International Business and Management vol. 3, No. 1, Jul. 3, 2001, pp. 176-188.

Logistic Regression Logistic Regression Web Page Documented from Wayback Machine dated Jul. 16, 2014, https://web.archive.org/web/20140716004031/ https://en.wikipedia.org/wiki/Logistic_regression, pp. 1-18.

* cited by examiner

EXTERNALLY AUGMENTED PROPENSITY MODEL FOR DETERMINING A FUTURE FINANCIAL REQUIREMENT

CROSS-REFERENCE TO RELATED APPLICATIONS

This application is related to: U.S. patent application Ser. No. 15/143,499, filed Apr. 29, 2016, entitled "PROPENSITY MODEL FOR DETERMINING A FUTURE FINANCIAL REQUIREMENT"; U.S. patent application Ser. No. 15/143,485, filed Apr. 29, 2016, entitled "USER DATA AUGMENTED PROPENSITY MODEL FOR DETERMINING A FUTURE FINANCIAL REQUIREMENT"; U.S. patent application Ser. No. 15/169,721, filed May 31, 2016, entitled "APPLICATION OF MULTIPLE PROPENSITY MODELS FOR IDENTIFYING A FUTURE FINANCIAL REQUIREMENT"; U.S. patent application Ser. No. 15/169,726, filed May 31, 2016, entitled "APPLICATION OF MULTIPLE EXTERNALLY AUGMENTED PROPENSITY MODELS FOR IDENTIFYING A FUTURE FINANCIAL REQUIREMENT"; U.S. patent application Ser. No. 15/169,729, filed Jun. 1, 2016, entitled "TRANSMISSION OF A MESSAGE BASED ON THE OCCURRENCE OF A WORKFLOW EVENT AND THE OUTPUT OF AN EXTERNALLY AUGMENTED PROPENSITY MODEL IDENTIFYING A FUTURE FINANCIAL REQUIREMENT"; and U.S. patent application Ser. No. 15/169,728, filed May 31, 2016, entitled "TRANSMISSION OF MESSAGES BASED ON THE OCCURRENCE OF WORKFLOW EVENTS AND THE OUTPUT OF PROPENSITY MODELS IDENTIFYING A FUTURE FINANCIAL REQUIREMENT".

BACKGROUND

For growing businesses, access to financial resources is key to continue or increase growth. However, many growing businesses fail to appreciate that continued growth will likely put them in a position of financial need sometime in the near future. Thus, by the time many growing businesses initiate a process to obtain financing, they are at a disadvantage. For example, the process of applying for and obtaining a low interest rate business loan can be a burdensome and protracted experience. Consequently, a growing business may be forced to choose between a higher interest rate short-term loan, or stunting continued business growth by delaying some business activities until a lower interest rate loan can be obtained.

SUMMARY

In general, in one aspect, the invention relates to a method for utilizing an externally augmented propensity model for determining a future financial requirement of a business entity. The method includes obtaining at least one propensity model. Each propensity model, of the at least one propensity model, models how data associated with a business entity relates to a future financial requirement of the business entity. The method also includes gathering the data associated with the business entity. The data includes a first portion of data that is created based on a platform utilized by users associated with the business entity, and a second portion of data that includes financial data of at least one owner of the business entity. The data associated with the business entity matches at least a subset of the at least one propensity model. In addition, the method includes scoring the business entity by applying the at least one propensity model to the data associated with business entity. Further, the method includes generating, based on the score of the business entity, a classification of the future financial requirement of the business entity. Still yet, the method includes transmitting a message to the business entity based on the classification of the future financial requirement of the business entity.

In general, in one aspect, the invention relates to a system for utilizing an externally augmented propensity model for determining a future financial requirement of a business entity. The system includes a hardware processor and memory. Also, the system includes software instructions stored in the memory. The software instructions are configured to execute on the hardware processor, and, when executed by the hardware processor, cause the hardware processor to obtain at least one propensity model. Each propensity model, of the at least one propensity model, models how data associated with a business entity relates to a future financial requirement of the business entity. Also, when executed by the hardware processor, the software instructions cause the hardware processor to gather the data associated with the business entity. The data includes a first portion of data that is created based on a platform utilized by users associated with the business entity, and a second portion of data that includes financial data of at least one owner of the business entity. The data associated with the business entity matches at least a subset of the at least one propensity model. In addition, when executed by the hardware processor, the software instructions cause the hardware processor to score the business entity by applying the at least one propensity model to the data associated with business entity. Further, when executed by the hardware processor, the software instructions cause the hardware processor to generate, based on the score of the business entity, a classification of the future financial requirement of the business entity. Still yet, when executed by the hardware processor, the software instructions cause the hardware processor to transmit a message to the business entity based on the classification of the future financial requirement of the business entity.

In general, in one aspect, the invention relates to a non-transitory computer readable medium for utilizing an externally augmented propensity model for determining a future financial requirement of a business entity. The non-transitory computer readable medium stores instructions which, when executed by a computer processor, comprise functionality for obtaining at least one propensity model. Each propensity model, of the at least one propensity model, models how data associated with a business entity relates to a future financial requirement of the business entity. Also, the non-transitory computer readable medium stores instructions which, when executed by the computer processor, comprise functionality for gathering the data associated with the business entity. The data includes a first portion of data that is created based on a platform utilized by users associated with the business entity, and a second portion of data that includes financial data of at least one owner of the business entity. The data associated with the business entity matches at least a subset of the at least one propensity model. Further, the non-transitory computer readable medium stores instructions which, when executed by the computer processor, comprise functionality for scoring the business entity by applying the at least one propensity model to the data associated with business entity. Still yet, the non-transitory computer readable medium stores instructions which, when executed by the computer processor, comprise functionality for generating, based on the score of the business entity, a classification of the future financial requirement of the business entity. Moreover, the non-transitory computer readable medium stores instructions which, when executed by the computer processor, comprise functionality for transmitting a message to the business entity based on the classification of the future financial requirement of the business entity.

Other aspects and advantages of the invention will be apparent from the following description and the appended claims.

DETAILED DESCRIPTION

Figure 1A:
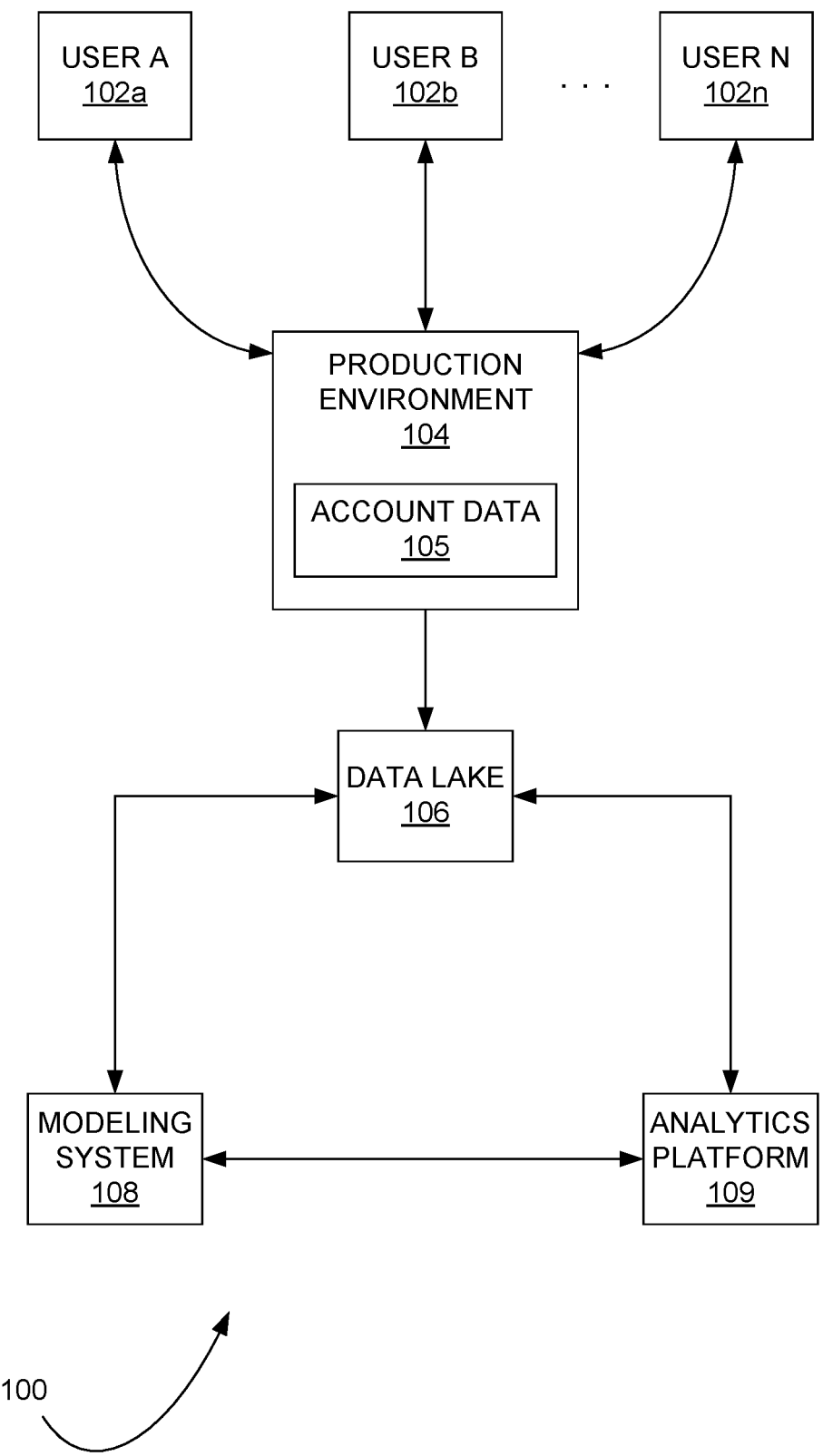
FIGS. 1A, 1B, and 1C illustrate systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1A, depicts a schematic block diagram of a system (100) for determining a future financial requirement, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

As illustrated in FIG. 1A, the system 100 includes a production environment (104), a data lake (106), an analytics platform (109), and a modeling system (108). The production environment (104) is in communication with a plurality of users (102). Also, the production environment (104) stores account data (105). Further, the production environment (104) is in communication with the data lake (106), and the data lake (106) is in communication with the analytics platform (109) and the modeling system (108). Also, the analytics platform (109) is shown in communication with the modeling system (108).

In one or more embodiments, the production environment (104), the data lake (106), the analytics platform (109), and the modeling system (108) may be separate physical computing systems that communicate via one or more computer networks. Similarly, the users (102) may communicate with the production environment (104) via one or more computer networks. As non-limiting examples, the computer network(s) may include wired and/or wireless portions of public and/or private data networks, such as wide area networks (WANs), local area networks (LANs), the Internet, etc.

In one or more embodiments, the production environment (104) includes any computing environment that provides for the real-time execution of a platform by users (102) of the platform. The production environment (104) may include processes, data, computational hardware, and software that perform specific tasks. The tasks may be performed by the production environment (104) on behalf of the users, in furtherance of organizational or commercial objectives of the users. For example, the production environment (104) may host a financial management platform that is used by the users. Specifically, the financial management platform may be utilized by the users to operate a business, such as, for example, by performing accounting functions, running payroll, calculating tax liabilities, billing customers, creating invoices, etc. More specific examples of financial management platforms include Intuit QuickBooks, Intuit TurboTax, etc.

As an option, the users of the platform may include individuals or clients that connect to the production environment (104) on behalf of respective businesses (i.e., "business entities"). Accordingly, each of the users (102a-102n) may include an individual operating a desktop computer, portable computer (e.g., laptop, netbook, etc.), or mobile device (e.g., tablet computer, cellular phone, smartphone, etc.), etc., to access the production environment (104) on behalf of a business entity. Each of the users (102a-102n) may utilize a local application (e.g., web browser) for accessing the production environment (104). Moreover, the users or business entities operating on the platform may pay for access to, and use of, the platform, such as, for example, in a subscription model.

In one or more embodiments, one or more of the users (102) that access a platform of the production environment (104) on behalf of a business entity may have an ownership interest in the business entity. For example, the production environment (104) may host a financial management platform utilized by a first business entity that operates as a sole proprietorship, which is entirely owned by a first user (102a). In one or more embodiments, one or more individuals with an ownership interest in a business entity that utilizes a platform of the production environment (104) may not access the platform on behalf of the business entity. For example, the production environment (104) may host a financial management platform utilized by a second business entity that is a partnership between two owners, each having a 50% ownership interest in the second business entity. One or both of the owners may not be users on the financial management platform, instead allowing each other and/or employees to manage the business entity on the financial management platform.

Of course, such examples are intended to be non-limiting examples, and a business entity utilizing a platform hosted by the production environment (104) may be incorporated in any legal manner (e.g., corporation, sole proprietorship, partnership, S corporation, C corporation, limited liability company, cooperative, etc.), with any number of individuals and/or other entities having an ownership interest. As used herein, an ownership interest in a business entity may provide the individual or entity with the ownership interest the right to control and/or profit from the business entity. As an option, an ownership interest may include a majority ownership interest or minority ownership interest. In one or more embodiments, a given business entity may be owned, in whole or in part, by one or more other entities. For example, a given business entity may be owned by one or more other businesses. Moreover, any number of individuals and/or entities having an ownership interest in a given business entity may access a platform on the production environment (104) for controlling, managing, monitoring, etc. the business entity.

In one or more embodiments, the production environment (104) may store account data (105). The account data (105) includes any information stored on the production environment (104) that is associated with, or utilized in the course of, a user's (102) interaction with a platform executing on the production environment (104). For example, where the production environment (104) includes a financial management platform executing thereon, and the financial management platform is utilized by user A (102a) for managing the operation of a business, then the account data (105) may include invoicing information, billing information, inventory information, payroll information, and/or user access metadata, etc. For purposes of simplicity, this data may herein be referred to as "business entity data."

In one or more embodiments, the data lake (106) includes any large-scale data storage system. The data lake (106) may include structured and/or unstructured data. For example, the data-lake may store tables, objects, files, etc. In one or more embodiments, the data lake (106) includes a copy of the account data (105) of the production environment (104). For example, as the users (102) utilize a platform of the production environment (104), changes to the account data (105) may be duplicated or pushed to copies located in the data lake (106). As described in more detail below, contents of the data lake (106) may be utilized by the modeling system (108) and/or the analytics platform (109) to create a propensity model, apply a propensity model to business entity data, and/or score a business entity based on a propensity model application, without impacting the account data (105) of the production environment (104). For example, the data lake (106) may be utilized for running queries, performing feature engineering, and other data analytics operations. As an option, the data lake (106) may operate on a clustered computing environment, such as a Hadoop cluster.

In one or more embodiments, the analytics platform (109) includes any environment for performing computational and/or statistical analysis. As an option, the analytics platform (109) includes a massively parallel processing system. Accordingly, the analytics platform (109) may be employed to rapidly explore data stored in the data lake (106). For example, the analytics platform (109) may perform feature engineering or feature generation on contents of the data lake (106). As an option, the analytics platform (109) may include a commercial computing system, such as IBM Netezza or Hewlett-Packard Vertica.

In one or more embodiments, the modeling system (108) includes a computing system operable to generate a propensity model. In one or more embodiments, the modeling system (108) may utilize the data lake (106) and/or the analytics platform (109) to generate a propensity model. For example, the analytics platform (109) may, under the control of the modeling system (108), perform feature engineering to identify deterministic aspects of business entity data and owner financial data, and subsequently generate rules based on such features. Moreover, a propensity model may be built using the generated rules. For example, the rules may be included in a rule ensemble-type model.

Figure 1B:
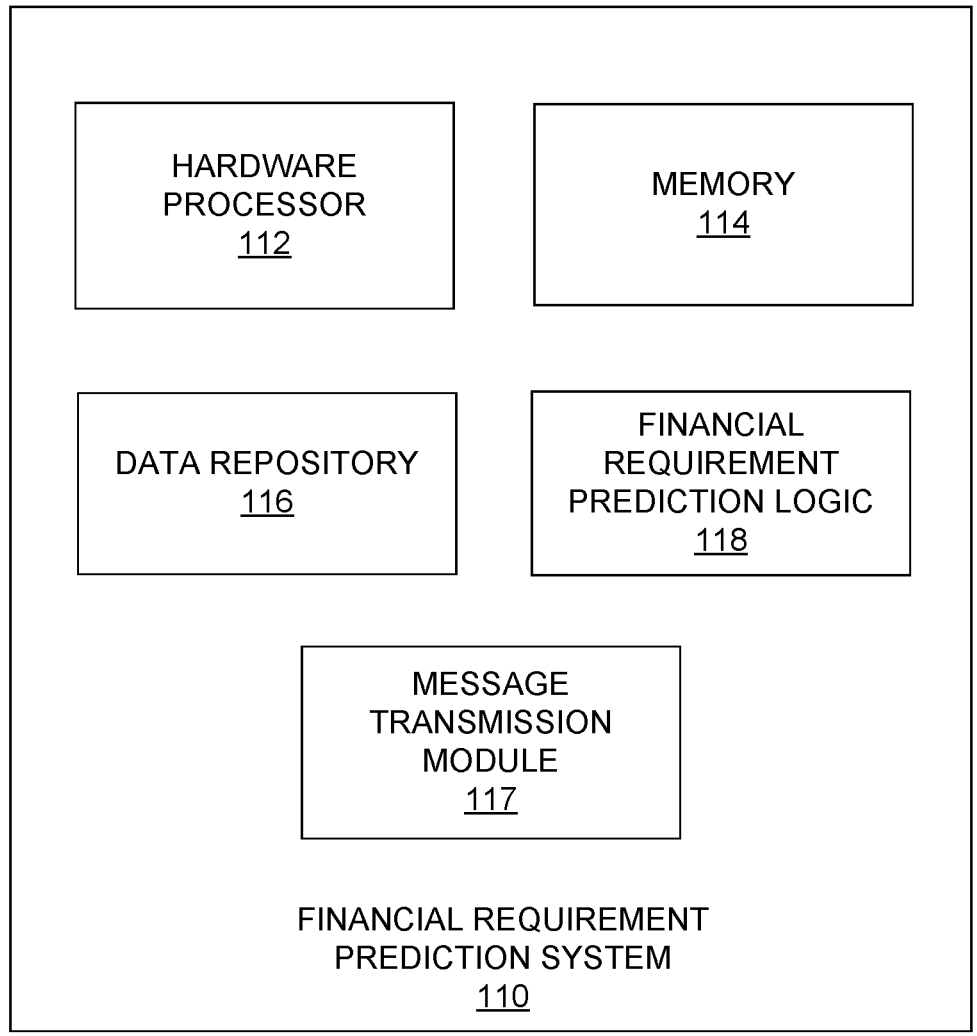

FIG. 1B shows a financial requirement prediction system (110) in accordance with one or more embodiments of the invention. The prediction system (110) is shown to include a hardware processor (112), memory (114), a data repository (116), financial requirement prediction logic (118), and a message transmission model (117), each of which are discussed in more detail below.

The financial requirement prediction logic (118) includes hardware and/or software for predicting a financial requirement of a business entity. As used herein, the "financial requirement" may include a future financial need of the business entity. As described in more detail below, the financial requirement may be identified using financial data of the business entity, metadata associated with the business entity, and/or financial data of the owners of the business entity. Moreover, a "business entity" includes any person or company that is engaged in a commercial enterprise. For example, in one or more embodiments, a business entity may include a physician practicing as a solo practitioner in the state of California. As another example, a business entity may include a bakery with a downtown storefront in Philadelphia, Pa., and which is incorporated in the state of Delaware. As described in more detail below, any interaction of an employee of the business entity with a financial management platform may be attributed to the business entity. For example, the creation of transaction records (e.g., sales records, purchase orders, etc.) by an employee of the bakery in Philadelphia may be attributed, within the financial management platform, to the bakery.

In one or more embodiments, business entity data may be stored in the data repository (116). As described in more detail below, the business entity data may include financial data and/or metadata associated with one or more business entities. Also, financial data of the owners of the one or more business entities may be stored in the data repository (116). In one or more embodiments, the business entity data and owner financial data in the data repository (116) that is associated with a business may be utilized to determine a future financial requirement of the business. Accordingly, the determination of the future financial requirement of the business may rely not only on financial data and metadata associated with the business, but may also rely on the financial data of one or more owners of the business. In this manner, the assessment of the future financial need of a given business may be augmented by information regarding the owner of the business, which may be considered data external to the business.

For example, the data repository (116) may include numerous records, where each record is associated with a different business entity. Moreover, each record includes data of the corresponding business entity or financial data of the owner of the corresponding business entity, where the included data matches the rules of a propensity model. In other words, only a portion of a given business entity's data stored in a production environment may be present in a record in the data repository (116). Also, the data repository (116) may store the data of only a subset of the business entities of a production environment, and their respective owners. In this manner, some data (e.g., columns, etc.) associated with a given business entity that is not useful for predicting a financial need of the business entity may be excluded from storage at the data repository (116), and the data associated with some business entities may be altogether excluded from storage at the data repository (116).

In one or more embodiments, the data repository (116) is any type of storage unit and/or device (e.g., a file system, database, collection of tables, or any other storage mechanism) for storing data. Further, the data repository (116) may include multiple different storage units and/or devices. The multiple different storage units and/or devices may or may not be of the same type or located at the same physical site.

In one or more embodiments, the hardware processor (112) includes functionality to execute the financial requirement prediction logic (118). Moreover, the financial requirement prediction logic (118), or a copy thereof, may reside in the memory (114) during the execution. In one or more embodiments, financial requirement prediction system (110) may include hardware components (not shown) for enabling communication between the hardware processor (112), the memory (114), the data repository (116), the financial requirement prediction logic (118), and/or the message transmission module (117). For example, the prediction system (110) may include a system bus for communication between the hardware processor (112), the memory (114), the data repository (116), the financial requirement prediction logic (118), and/or the message transmission module (117).

Further, as described herein, the message transmission module (117) includes logic for providing a message to a business entity. In one or more embodiments, the message transmission module (117) may include software and/or hardware for initiating transmission, via a computer network, of an electronic message to a business entity. In such embodiments, the message may include an email, a web page, or an advertisement. In one or more embodiments, the message transmission module (117) may include software and/or hardware for initiating transmission, via physical correspondence, of a message to a business entity. In such embodiments, the message may include printed matter (e.g., a letter, postcard, flyer, etc.) or other promotional material that delivered to a mailing address of a business entity. As an option, the message transmission module (117) may generate a list of business entities and/or messages. The list of business entities and/or messages may be used (e.g., by a third-party vendor) for sending the messages via physical correspondence to the business entities in the list.

In one or more embodiments, the message transmission module (117) may be pre-configured with policies. Moreover, based on the policies, the message transmission module (117) may determine whether a given business entity will receive an electronic message or physical correspondence. For example, the financial requirement prediction logic (118) may utilize a score of a business entity to classify a future financial requirement of the business entity, and the message transmission module (117) may then transmit a message to the business entity based on the classification of the future financial requirement.

Figure 1C:
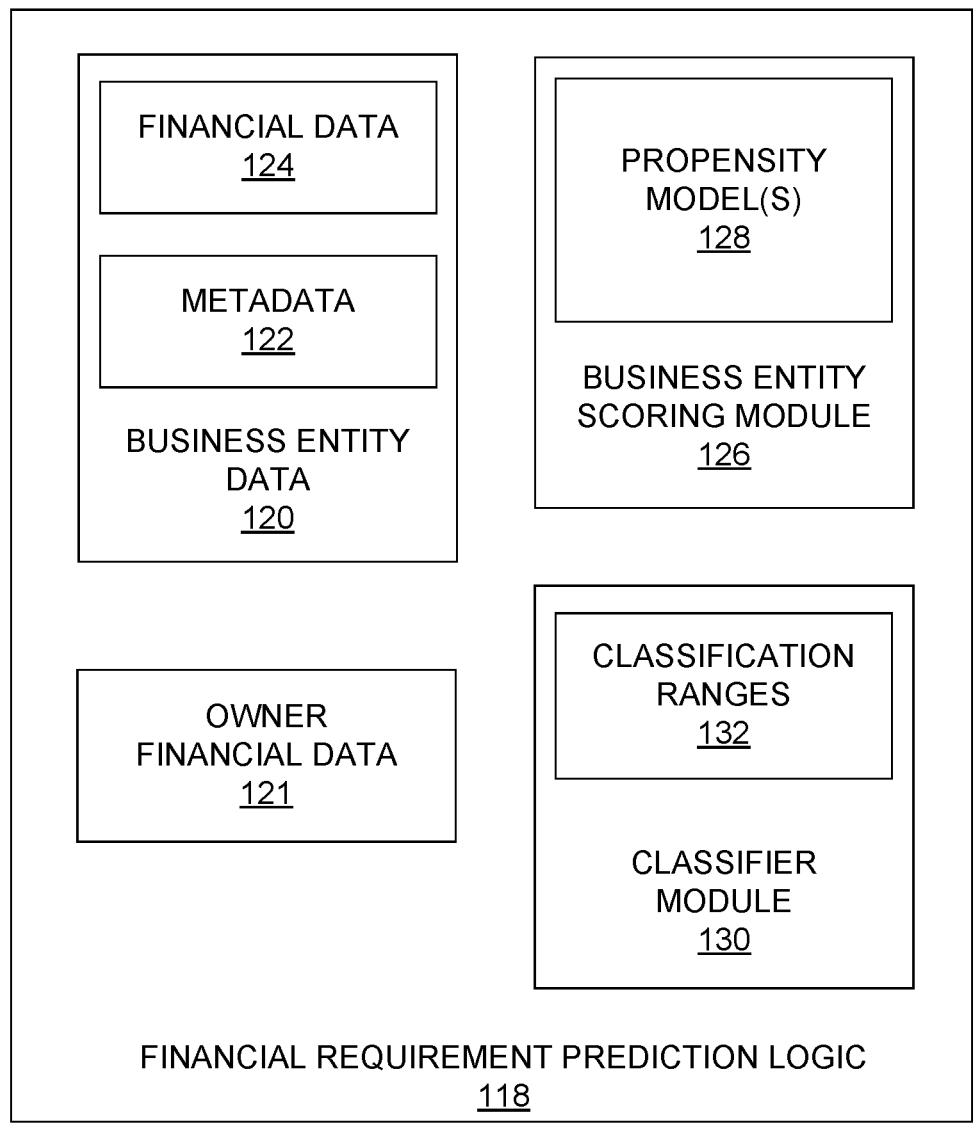

Referring now to FIG. 1C, the financial requirement prediction logic (118) includes business entity data (120), owner financial data (121), a business entity scoring module (126), and a classifier module (130). Further, the business entity data (120) is shown to include financial data (124) and metadata (122). Also, the business entity scoring module (126) is shown to include propensity model(s) (128). The classifier module (130) is shown to include classification ranges (132). Each component of the financial requirement prediction logic (118) is discussed in more detail, below.

In one or more embodiments, the owner financial data (121) includes financial data of one or more owners of a business entity. As described herein, the owner of a business entity includes any person having an ownership interest in a business entity for which business entity data (120) is collected. For example, where the business entity data (120) includes financial data (124) and metadata (122) for a given sole proprietorship, the owner financial data (121) may include information regarding the finances of the owner of the sole proprietorship. As another example, where the business entity data (120) includes financial data (124) and metadata (122) for a given partnership having two owners, the owner financial data (121) may include information regarding the finances of one or both owners of the partnership.

In one or more embodiments, the owner financial data (121) may include a credit report and/or credit score for one or more owners of a business entity. For example, the owner financial data (121) may include a FICO score for each of the one or more owners of a business entity. As an option, a credit report and/or credit score for the owners of a business entity may be retrieved from a credit reporting agency. Also, as an option, the owner financial data (121) may include a default or late payment history of the one or more owners of a business entity, which may be determined, for example, using the credit reports of the owners of the business entity.

In one or more embodiments, the owner financial data (121) may include income information of one or more owners of a business entity. For example, the owner financial data (121) may include gross income, income after taxes, capital gains, hourly wages, a salary, etc. As an option, income information for an owner may be obtained from a financial management platform utilized by the owner, such as, for example, Intuit's TurboTax, or from tax return information (e.g., documents filed with a tax-collecting entity, such as the Internal Revenue Service). Accordingly, in one or more embodiments, the owner financial data (121) may include tax information for one or more owners of a business entity.

In one or more embodiments, the owner financial data (121) may include any information maintained by a financial management platform that is utilized by an owner. The financial management platform may include any platform utilized for calculating personal tax liabilities, managing personal finances, paying bills, trading stocks, and other personal banking activities. More specific examples of financial management platforms include Intuit TurboTax, mint.com, etc. As an option, the information included in the owner financial data (121) for a given owner of the business entity may include: an amount of money in checking and/or savings accounts of the owner, an amount of money in tax-deferred accounts (e.g., IRA, 401(k), other retirement and investment accounts, etc.), assets and property owned by the owner, a value of the assets and property owned by the owner, the number of outstanding mortgages in the name of the owner, and/or the value of the outstanding mortgages in the name of the owner. As an option, any limitations on money in tax-deferred accounts held by an owner of a business entity may be included in the owner financial data (121). For example, the owner financial data (121) may identify withdrawal restrictions on money held in an education savings plan (e.g., a 529 plan) or a retirement savings account (e.g., a 401(k), IRA, etc.) held by an owner of the business entity.

In one or more embodiments, the owner financial data (121) may include information from public records that have been collected for one or more owners of a business entity. For example, the owner financial data (121) may include a bankruptcy history for each of the one or more owners of a business entity. As another example, the owner financial data (121) may include a criminal history of each of the one or more owners of a business entity, and/or suits or judgments against each of the one or more owners of a business entity. Still yet, the owner financial data (121) may include liens held against any property owned by each of the one or more owners of a business entity.

In one or more embodiments, the owner financial data (121) may include information synthesized from a combination of a credit report, income information, information obtained from a financial management platform, and/or information from public records. For example, utilizing information from public records and a credit report of an owner of a business entity, any monthly payments of the owner (i.e., mortgages, automotive payments, lease payments, etc.) may be determined. As an option, the synthesized information my include an amount of equity held by the owner in assets, such as, for example, real property. Also, as an option, the synthesized information may include an amount of money that the owner is saving on a weekly, monthly, yearly, etc. basis. For example, the owner financial data (121) may include an amount of money invested into mutual funds on a monthly basis and/or an amount of money saved to a savings account on a monthly basis.

In one or more embodiments, the business entity data (120) includes the data of a business entity. More specifically, the business entity data (120) includes financial data (124) and metadata (122) of a given business entity.

In one or more embodiments, the financial data (124) of a business entity includes any economic data associated with, generated by, or generated on behalf of, the business entity during the course of its commercial operations. As an option, the financial data (124) may include cash flow or transaction information. Transaction information of a business entity may include one or more of invoice information of the business entity, deposit information of the business entity, and expense information.

More specific examples of transaction information include a number of invoices issued by the business entity for a time period, a total value of the invoices for a time period, and/or an average value of the invoices for a time period, etc. Also, as an option, the transaction information may include a value of outstanding invoices due to be paid to the business entity, a number of outstanding invoices due to the business entity, and a spread of the outstanding invoices among customers of the business entity. Further, the transaction information may include a value of payments received by the business entity, a number of bank deposits performed by the business entity, a total value of deposits for a time period, and/or an average value of deposits for a time period, etc. Still yet, the transaction information may include the value of outstanding bills the business entity is due to pay, a number of expenses of the business entity for a time period, a total value of the expenses for a time period, a relative amount of expenses to invoices, and/or an average value of the expenses for a time period, etc.

Also, the financial data (124) of a business entity may include, for example: a net worth of the business entity; a tangible net worth of the business entity; a net margin of the business entity; an annual sales revenue of the business entity; a monthly average of the credits of the business entity; a number of days turnover of accounts receivable for the business entity; sales growth of the business entity; earnings of the business entity before interest, taxes, depreciation, and amortization; and transaction information of the business entity.

As an option, the financial data (124) may include week-over-week, month-over-month, year-over-year, etc. trends of any of the above information, expressed as a dollar value or a percentage.

In one or more embodiments, the metadata (122) includes any non-economic information maintained about a given business entity. The metadata (122) of a business entity may be recorded by a platform as users associated with the business entity interact with the platform. For example, the metadata (122) of a given business entity may be collected as users associated with the business entity input new items in an inventory tracked utilizing the financial management platform. Accordingly, the metadata (122) for a given business entity may also be herein referred to as platform metadata. In one or more embodiments, the metadata (122) may include audit history data or clickstream data. For example, the metadata (122) may include transaction record creation activities, transaction record closing activities, platform logins, reporting activities by, and/or viewing activities of one or more users of the business entity.

Other specific illustrations of the metadata (122) include, for example: a number of inventory items recorded in a financial management platform; a version of a financial management platform utilized by a business entity (e.g., an older version of the platform instead of upgrading to a newer version); the roles (e.g., cashiers, managers, accountants, etc.) of users with access to a financial management platform utilized by a business entity; the last time a user of the business entity accessed the financial management platform for managing the commercial activities of the business entity; a number of accesses of the financial management platform by users of the business entity; a duration of time that the business entity has utilized the financial management platform; a geographic location of operation of the business entity; a business classification of the business entity; and an age of the business entity.

In one or more embodiments, the duration of time that the business entity has utilized the financial management platform may be calculated utilizing a first charge date. A first charge date includes a past point in time that is identified as the beginning of a business relationship between the business entity and the financial management platform (i.e., the beginning date of a subscription to the financial management platform, etc.). As an option, the first charge date may be represented as calendar date (e.g., Jan. 3, 2013, May 10, 2011, etc.); or as a measureable quantity of time periods between the first charge date and a given date (e.g., 8 weeks, 56 days, 2 months, 0.154 years, etc.). The given date may be a current date, a date that has already passed, or a date in the future.

As an option, the age of the business entity may be determined based on input from a user of the business entity. For example, the user may specify that the business was started in 1990, or has been doing business for 26 years. As another option, the age of the business entity may be determined from a third-party source. For example, a year of incorporation of the business entity, or other starting date, may be obtained from public records (e.g., Secretary of State, Division of Corporations, etc.), or from a private entity, such as Dun & Bradstreet.

A rule directed to a geographic location of operation of the business entity may include a condition regarding a country of operation (e.g., United States of America, Canada, etc.), a region of operation (e.g., Pacific Northwest, etc.), a state of operation (e.g., California, Illinois, Arkansas, etc.), a city of operation of the business entity. Also, a rule directed to a business classification of the business entity may rely on a standardized classification system, such as, for example, North American Industry Classification System (NAICS).

Additional illustrations of the metadata (122) include, for example: demographics of the customers of the business entity; employee information, such as the number of employees of the business entity; observed bookkeeping practices of the business entity; a general climate of the business entity's commercial practices; an overall climate of a localized, regional, national, or global economy; economic trends; the tax form(s) utilized by the business entity to report income to a government; opinions and reviews of the business entity as determined from social networks; and a number of packages being regularly shipped (e.g., per day, week, month, etc.) by the business entity.

As an option, bookkeeping practices may include when users of the business entity update transaction records (e.g., time of a day), a frequency with which the users of the business entity update transaction records, and/or locations from which the users of the business entity update transaction records. For example, all other things being equal, a business entity that has an accountant maintaining the books of the business entity on a regular weekly basis may be scored lower by the propensity model than a business entity that has a user updating transactions once every month.

The financial data (124) and the metadata (122) of a given business entity, in conjunction with the financial data (121) of an owner of the business entity, may be utilized as input to the propensity model(s) (128) for determining a financial need of the business entity, as described in more detail below.

In one or more embodiments, one or more propensity model(s) (128) may be generated by the modeling system (108) shown in FIG. 1A using the analytics platform (109) and/or the data lake (106). Accordingly, the modeling system (108) may generate the propensity model(s) (128) using the account data (105), or a subset thereof, that originates from the production environment (104). As an option, the modeling system (108) may generate the propensity model(s) (128), or a subset thereof, using the financial data of the owners of business entities associated with the account data (105). The financial data of the owners of the business entities may be retrieved from any feasible source, such as, for example, credit reporting agencies, banks, personal finance portals, government agencies, public records, tax returns, etc.

In one or more embodiments, where the production environment (104) includes a financial management platform utilized by various business owners for managing their respective business entities, a single propensity model may be generated based on the account data (105) associated with the business entities and the financial data of the owners of the business entities. Accordingly, the propensity model(s) (128) may include a single propensity model (not shown) for application to the business entity data (120) and the owner financial data (121).

In one or more embodiments, where the production environment (104) includes a financial management platform utilized by various business owners for managing their respective business entities, a first propensity model may be generated based on the account data (105) associated with the business entities, and a second propensity model may be generated based on the financial data of the owners of the business entities. Accordingly, the propensity model(s) (128) may include a first propensity model (not shown) for application to the business entity data (120), and a second propensity model (not shown) for application to the owner financial data (121).

In one or more embodiments, where the production environment (104) includes a financial management platform utilized by various business owners for managing their respective business entities, a first propensity model (not shown) may be generated based on the account data (105) associated with the business entities, and numerous additional propensity models may be generated based on the financial data of the owners of the business entities. As an option, a second propensity model (not shown) may be generated using the owner financial data of the owners of any sole proprietorships, a third propensity model (not shown) may be generated using the owner financial data of the owners of any partnerships, and a fourth propensity model (not shown) may be generated using the owner financial data of any S-corps. As another option, a second propensity model (not shown) may be generated using the owner financial data of owners having a majority ownership interest in their respective business entities, and a third propensity (not shown) model may be generated using the owner financial data of owners having a minority ownership interest in their respective business entities. For example, the second propensity model (not shown) may be generated based on the financial data of the owner of any business entity with >50% ownership interest in the business entity, and the third propensity model (not shown) may be generated based on the financial data of the owner of any business entity with <50% ownership interest in the business entity. Accordingly, the propensity model(s) (128) may include a first propensity model (not shown) for application to the business entity data (120), and two or more additional propensity models (not shown) for application to the owner financial data (121).

In one or more embodiments, the business entity scoring module (126) applies the propensity model(s) (128) to the business entity data (120) and the owner financial data (121) to generate a score for a business entity. In one or more embodiments, the propensity model(s) (128) may include a plurality of different rules. Accordingly, applying the propensity model(s) (128) to the business entity data (120) and the owner financial data (121) may include testing or comparing the business entity data (120) and the owner financial data (121) against the rules of the propensity model(s) (128).

For example, by applying the propensity model(s) (128) to the data (120) of a business entity, one or more aspects of the business entity financial data (124) and/or the business entity metadata (122) may be compared to rules regarding business entity data. Similarly, by applying the propensity model(s) (128) to the owner financial data (121), one or more aspects of the finances of the business entity's owner(s) may be compared to rules regarding the financial position of a business owner.

As an option, for any of the various types of the metadata (122), changes over a period of time may be observed and utilized within the propensity model(s) (128) for scoring the business entity. For example, due to rules of the propensity model(s) (128), a business entity that has been shipping an increasing number of packages month-over-month may score more highly than a business that has been consistently shipping the same number of packages month-over-month. Similarly, as an option, for any of the various types of owner financial data (121), changes over a period of time may be observed and utilized within the propensity model(s) (128) for scoring the business entity. For example, due to rules of the propensity model(s) (128), a business owned by an individual that shows a decreasing month-over-month trend in mortgage and car payments may score more highly than a business owned by an individual that shows no decreasing trend in mortgage and car payments. As an option, a rule in the propensity model(s) (128) may combine one or more financial aspects of the financial data (124), one or more aspects of the non-financial metadata (122), and/or one or more aspects of the owner financial data (121). For example, a given rule may include a condition regarding a first charge date of the business entity, as well as a condition regarding sales growth of the business entity. As another example, a given rule may include a condition regarding a first charge date of the business entity, as well as a condition regarding the outstanding value of mortgages in the name of the owner of the business entity. As yet another example, a given rule may include a condition regarding annual sales of the business entity, as well as a condition regarding the credit scores of all owners of the business entity.

In one or more embodiments, each of the rules in the propensity model(s) (128) may be associated with a support value, a coefficient, and/or an importance value. The support value of a rule may indicate a fraction of time for which the condition of the rule was true, based on the data that was used to build the propensity model(s) (128). For example, for a rule with the conditions of "STATE==CA & OUTSTANDING_INVOICES>=17," and a support value of 0.643, the support value would indicate that of the business entities whose data was used to build the propensity model(s) (128), approximately 64.3% of those business entities were located in California and had at least 17 outstanding invoices. Additionally, the coefficient of a rule may indicate an impact the rule has on the outcome, where an absolute value of the coefficient indicates a weight (i.e., less likely to need financing). Accordingly, a larger coefficient may result in a greater impact on a final score. As an option, each coefficient may be either positive or negative. Thus, the sign of a given coefficient may indicate whether the coefficient impacts a final score in an increasing or decreasing manner (i.e., increases or decreases the final score when the associated rule is determined to be true).

Still yet, the importance value of a rule may be a global measure reflecting an average influence of a predictor over the distribution of all joint input variable values. In one or more embodiments, the rules of the propensity model(s) (128) may be ranked based on the corresponding importance values of each of the rules. In one or more embodiments, any ranking of the rules may be performed on a per model basis. For example, all rules in a first propensity model (not shown) of the propensity models (128) may be ranked relative to the other rules in the first propensity model, while all rules in a second propensity model (not shown) of the propensity models (128) may be ranked against the other rules in the second propensity model.

In one or more embodiments, each propensity model may be expressed as a mathematical formula, such that the application of a propensity model to the business entity data (120) and the owner financial data (121) includes calculating a score for the business entity according to the mathematical formula. For example, application of the propensity model(s) (128) to the business entity data (120) and the owner financial data (121) may include determining, for each rule in the propensity model(s) (128), whether or not the rule is true when applied to the data (120) of the business entity and/or the financial data (121) of the owner of the business entity. If the rule is true, then a pre-determined value may be multiplied by the coefficient associated with the rule to generate a result. This may be repeated for each of the rules in the propensity model(s) (128) utilizing the business entity data (120) and the owner financial data (121) to generate a plurality of results. Moreover, each of the results may be summed to calculate a score of the business entity. As an option, the summation of the results may be adjusted or normalized to calculate the score of the business entity.

In one or more embodiments, if a given propensity model of the propensity model(s) (128) includes two rules, then business entity data (120) and owner financial data (121) may be gathered such that the business entity data (120) and owner financial data (121) matches the two rules. Further, the business entity scoring module (126) may score the business entity by, for each rule in the given propensity model, determining whether the rule, as applied to the data (120) of the business entity and the financial data (121) of the owner of the business entity, evaluates as true or false. For each of the rules that evaluates as true, a coefficient associated with that rule is multiplied by a value of '1,' and for each of the rules that evaluates as false, the coefficient associated with that rule is multiplied by a value of '0.' Moreover, the products may be summed. Thus, if a first rule in one of the propensity models (128) is associated with a coefficient of 0.880, and a second rule in the one of the propensity models (128) is associated with a coefficient of −0.349, then a score of 0.531 may be calculated for the business entity when both rules evaluate as true (i.e., (1*0.880)+(1*−0.349)=0.531).

As noted above, in one or more embodiments, the propensity models (128) may include a first propensity model directed to the data (120) of a business entity, as well as one or more additional propensity models directed to the financial data (121) of the owner of the business entity. For example, the first propensity model may include rules directed to the year-over-year sales growth and the value of outstanding invoices of the business entity; and a second propensity model may include rules directed to the salary of, and value of assets held by, the owner of the business entity. In such an example, the business entity data (120) may be gathered such that it matches the rules of the first propensity model. Similarly, the owner financial data (121) may be gathered such that it matches the rules of the second propensity model. Further, the business entity scoring module (126) may generate a first sub-score for the business entity by: for each rule in the first propensity model, determining whether the rule, as applied to the data (120) of the business entity, evaluates as true or false; for each of the rules that evaluates as true, multiplying a coefficient of that rule by a value of '1'; and summing the products. Similarly, the business entity scoring module (126) may generate a second sub-score for the business entity by: for each rule in the second propensity model, determining whether the rule, as applied to the owner financial data (121), evaluates as true or false; for each of the rules that evaluates as true, multiplying a coefficient of that rule by a value of '1'; and summing the products.

Moreover, the first sub-score and the second sub-score may be combined by the business entity scoring module (126) according to an aggregation model to obtain a score for the business entity. As an option, the first sub-score and the second sub-score may be summed or averaged to obtain the score for the business entity. One or more of the sub-scores may be weighted to increase or decrease the effect of the sub-score on the score of the business entity.

In one or more embodiments, as noted above, a given business entity may have two or more owners. As an option, a different sub-score may be calculated for each of the owners. Moreover, the contribution of each sub-score to the score of the business entity may be weighted by an aggregation model according to the owners' respective ownership interests. For example, a sub-score of an owner with a majority interest in a business entity may be more highly weighted than a sub-score of an owner with a minority interest in the business entity. As another option, a single sub-score may be calculated that is representative of all of the owners of a business entity, and that sub-score may be combined, by the business entity scoring module (126) and in accordance with an aggregation model, with a sub-score generated utilizing the business entity data (120).

Accordingly, in one or more embodiments, the propensity model(s) (128) may include some combination of sub-models and aggregation models that are applied to the data (120) of a business entity and the financial data (121) of an owner of the business entity to identify a future financial requirement of the business entity.

In one or more embodiments, the propensity model(s) (128) may be utilized to score numerous business entities. For example, the business entities may be scored in parallel, as a batch, etc.

In one or more embodiments, the classifier module (130) includes hardware and/or software for segmenting business entities based on the scores attributed to the business entities by the business entity scoring module (126). In one or more embodiments, the classifier module (130) may classify the business entities using the classification ranges (132). As an option, the classification ranges (132) may include one or more pre-determined ranges of values, where each of the ranges is associated with a discretized level of financial need.

For example, business entities may be classified by dividing up the business entities into four quartiles. Those business entities classified in the highest 25% of scores may have the greatest likelihood of needing a financial infusion or loan product, which may be used to help the business grow. Conversely, those business entities classified in the lowest 25% of scores may be identified as having the lowest likelihood of needing a financial infusion or loan product. As an option, by classifying the business entities, those with the greatest future financial requirement may be rapidly identified and offered a loan product.

While FIGS. 1A, 1B, and 1C show one possible configuration of components, other configurations may be used without departing from the scope of the invention. For example, various components may be combined to create a single component. As another example, the functionality performed by a single component may be performed by two or more components.

Figure 2A:
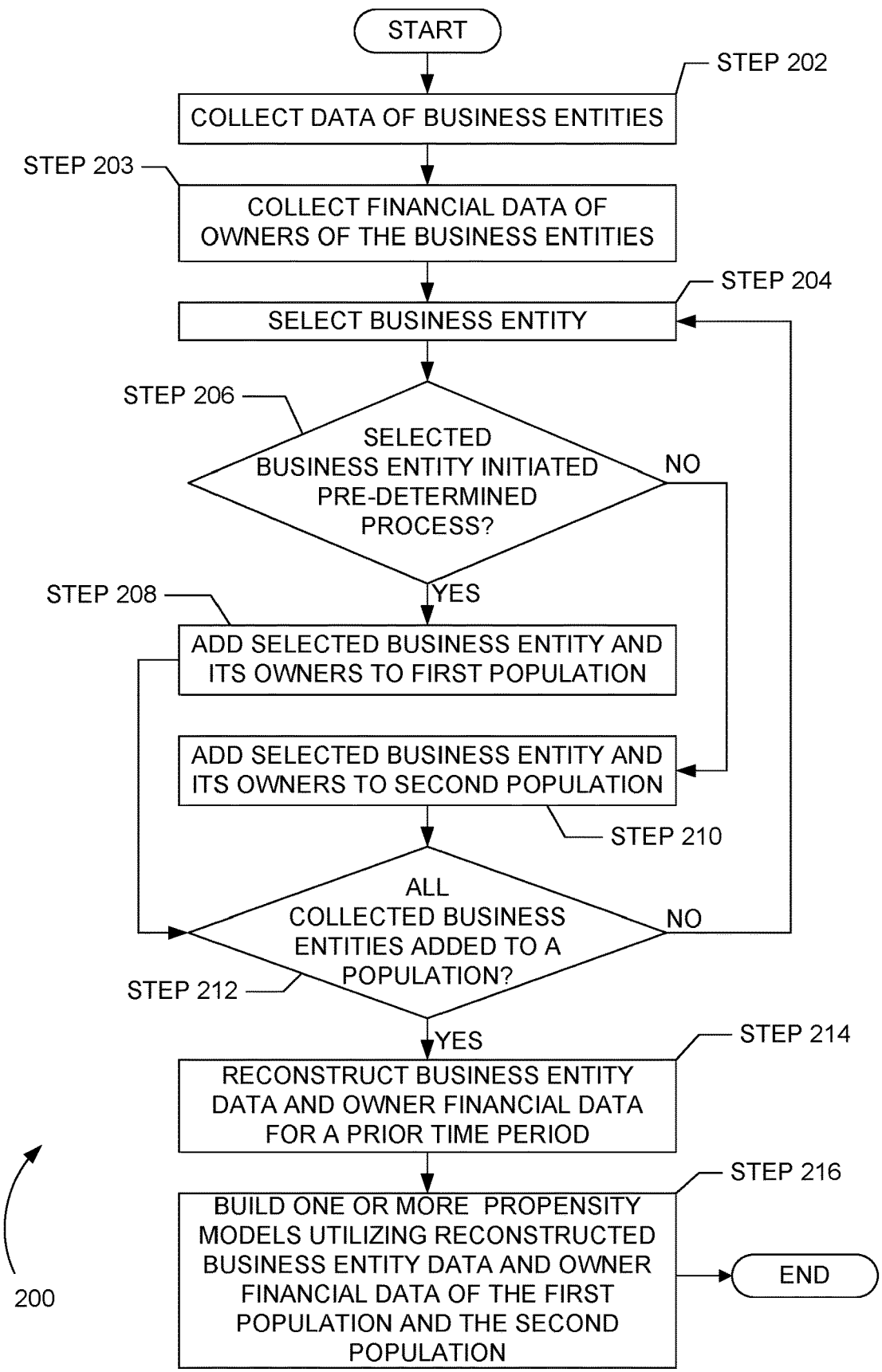
FIGS. 2A and 2B illustrate methods performed in accordance with one or more embodiments of the invention.

FIG. 2A depicts a flowchart of a method (200) of generating a propensity model to determine a future financial requirement, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using the system (100) described in reference to FIG. 1A and the system (110) described in reference to FIGS. 1B and 1C, above, and/or involving the computing system (500) described in reference to FIG. 5A.

At Step 202, data of numerous business entities is collected. In one or more embodiments, the data of the business entities includes financial data of the business entities. For example, the data may include outstanding amounts due, payroll information, and an invoice spread. In one or more embodiments, the data of the business entities includes metadata of the business entities. For example, the metadata may include login and access habits of the users of the business entities. Moreover, collecting the data may include any acquisition of the data. For example, the data may be retrieved from a production environment (104) or data lake (106), as described in the context of FIG. 1A.

At Step 203, financial data of the owners of the business entities is collected. In one or more embodiments, the collected financial data may include only the financial data of owners with an interest in the corresponding business entity that exceeds a threshold ownership interest. For example, financial data may be collected, at Step 203, only for individuals with greater than 33%, 50%, 75%, etc. ownership interest in any of the business entities for which data was collected at Step 202. In this way, the financial data of owners with less than the threshold ownership interest may be prevented from contributing to the building of one or more propensity models. In one or more embodiments, the collected financial data may include the financial data of owners with any interest in any of the business entities for which data was collected at Step 202. As an option, one or more rules in propensity models built using the method (200) may include a condition directed to an ownership interest held by an owner of a business entity.

In one or more embodiments, each of the business entities for which data is collected at Step 202 may have previously received an actionable offer. Moreover, the previously received actionable offers may include financial offers. For example, the actionable offers may have included offers for loans, such as business loans. Accordingly, each of the business entities for which data is collected may have previously received offers for business loans. Moreover, each of the offers for business loans may have been tailored for the business entity by which it was received. As an option, the actionable offers may have been provided to the business entities by physical correspondence (e.g., a mailed letter, postcard, etc.), by electronic correspondence (e.g., email, instant message, etc.), or as a targeted advertisement (e.g., advertisement in a webpage, etc.).

A first one of the business entities is selected at Step 204. Next, at Step 206, it is determined whether the selected business entity initiated a pre-determined process. In one or more embodiments, the pre-determined process may include any action taken in response an actionable offer. For example, the pre-determined process may include activating a link in response to the actionable offer, filling out a form in response to the actionable offer, calling a phone number in response to the actionable offer, submitting a loan application in response to the actionable offer, calling a loan officer in response to the actionable offer, and/or visiting a website in response to the actionable offer. In other words, where the actionable offer includes an offer for a loan, then the pre-determined process may include an event that indicates the business entity showed interest in the loan.

If, at Step 206, it is determined that the selected business entity initiated the pre-determined process, then the selected business entity and its owners are added, at Step 208, to a first population of business entities and business owners. However, if, at Step 206, it is determined that the selected business entity did not initiate the pre-determined process, then the selected business entity and its owners are added, at step 210, to a second population of business entities business owners. In one or more embodiments, the selected business entity and its owners may be added to a population by setting a flag associated with the business entity. For example, a first flag (i.e., a bit '1', etc.) may be associated with the selected business entity if it initiated the pre-determined process, and a second flag (i.e., a bit '0', etc.) may be associated with the selected business entity if it did not initiate the pre-determined process.

Moreover, at Step 212, it is determined whether all business entities for which data has been collected have been added to the first population or the second population. If there are unclassified business entities remaining, such that at least one business entity and its owners have not been placed into the first population or the second population, then the method (200) returns to Step 204, where a next business entity is selected. Further, the next business entity and its owners are classified as belonging to the first population or the second population according to Steps 206-210, as described above. In one or more embodiments, the classification of the business entities into the first and second populations may occur in a parallel manner, such that multiple business entities and their respective business owners are simultaneously added to the two populations.

Accordingly, the classification of the business entities, for which data was collected at Step 202, and the owners of the business entities, for which data was collected at Step 203, continues until all of the business entities and the owners have been added to either the first population or the second population. Moreover, when it is determined, at Step 212, that all of the business entities have been added to one of the two populations, then the instances of business entity data and owner financial data are reconstructed, at Step 214. The reconstruction of the business entity data is performed such that the reconstructed business entity data is representative of a prior time period. Similarly, the reconstruction of the owner financial data is performed such that the reconstructed owner financial data is representative of the same prior time period.

For example, in one or more embodiments, the data for each of the business entities may include a corresponding transaction log, referred to herein as an audit history. For a given business entity, the audit history of the business entity may include a record (e.g., a line, a row, etc.) that indicates an action taken on behalf of the business entity, as well as a timestamp. The timestamp may include a date and/or time the action was performed. Moreover, the action taken on behalf of the business entity may include any action performed by the business entity, or a user associated with the business entity, within a production environment, such as the production environment (104) of FIG. 1A. For example, the business entity may include various user accounts (e.g., an accountant, a manager, a cashier, etc.) that are associated with the business entity. The various users may access a financial management platform hosted within a production environment. Within the financial management platform, the users may generate transaction data by creating invoices, making sales, applying payments to accounts, or performing other business transactions. A record of each transaction may be kept in an audit history of the business entity.

Accordingly, during a reconstruction of the data of the business entity, one or more transactions may be removed to generate reconstructed data for the business entity. In one or more embodiments, the removed transactions may include all transactions that occurred after a specified date. In other words, the reconstructed data of a business entity may include only transactions that were performed on behalf of the business entity on or prior to a particular date. As an option, the particular date may be a pre-determined time period prior to receipt, by the business entity, of an actionable offer. In other words, the particular date used to generate reconstructed data for a business entity may be a number of days, weeks, months, or years prior to when the business entity received an actionable offer.

In one or more embodiments, the financial data of the business owners may be reconstructed in a similar manner. For example, any financial transaction or events in the financial data of a business owner that occurred after the specified date may be removed to generate reconstructed financial data for the business owner. In other words, the reconstructed financial data of a business owner may include only the financial events or transactions of the business owner that were performed on or prior to a particular date. The particular date may be the same date that is used to generate reconstructed data for the business entity that is owned by the business owner.

For example, for a given business entity that receives an actionable offer for a business loan, all transactions that occurred subsequent to three months before the day the offer was received may be removed from the data of the business entity to generate the reconstructed business entity data; and all transactions or events in the financial data of the owner of the business entity that occurred subsequent to three months before the day the offer was received may be removed from the financial data of the owner to generate the reconstructed owner financial data. In this way, a snapshot of the business entity may be created that represents a state of the business entity and the financial state of its owner(s) before the business entity was offered a loan. Moreover, at Step 214, such snapshots may be created for all business entities in the first population and the second population. In this way, different business entities may receive offers for loans on different dates, and the business entity snapshots consistently represent the respective states of the different business entities, and the financial states of the respective owners, at corresponding earlier dates.

Next, at Step 216, one or more propensity models are built utilizing the reconstructed business entity data, and the reconstructed owner financial data, of the business entities in the first population and the second population. In one or more embodiments, the propensity models are built using machine learning, such as, for example, by applying a rule ensemble method to the reconstructed business entity data and owner financial data. For example, building the propensity models may include generating different rules, testing the rules against the reconstructed business entity data and owner financial data, and then ranking the different rules. Each of the rules may include one or more conditions. As an option, the ranks assigned to the rules may be determined by logistic regression. Also, a given propensity model may be configured to include tens, hundreds, or thousands of rules. As noted above, the propensity models built at Step 216 may include a first propensity model based on the reconstructed business entity data, and a second propensity model based on the reconstructed owner financial data. Of course, however, a single propensity model may be built at Step 216 that includes rules directed to both business entity data and owner financial data.

In one or more embodiments, after building the propensity models at Step 216, the rules of the propensity models may be modified. As an option, the rules may be modified manually, by a data scientist or engineer. A rule may be modified by altering its coefficient, by deleting a rule, by changing conditional values, etc. For example, using the example described above, where the rule includes a condition of "OUTSTANDING_INVOICES>=17," the condition of the rule may be modified to require "OUTSTANDING_INVOICES>=19." In this way, the strength of the propensity model may be iteratively tested and improved.

As an option, if two or more propensity models are built at Step 216, then an aggregation model may also be built at Step 216. The aggregation model may include rules for combining the outputs of two or more propensity models, such that the two or more propensity models are sub-models for the aggregation model. The aggregation model may control how results of the two or more sub-models are combined to arrive at a final score of a business entity, as described below.

Because the propensity models are built utilizing the reconstructed business entity data and reconstructed owner financial data of the two populations, the propensity models may serve to identify differences that differentiate the data of the business entities, and the respective owners, that initiated a pre-determined process from the business entities, and the respective owners, that did not initiate the pre-determined process.

After the propensity models have been built, the propensity models may be tested using testing data. In particular, the testing data may include data for numerous business entities that previously received actionable offers, and the respective owners. Moreover, for each of the business entities included in the testing data, the outcome of whether the business entity initiated the pre-determined process, in response to the actionable offer, may be known. For example, the testing data may include a plurality of business entities that received offers for business loans, and, for each of the business entities in the testing data, it is known whether or not that business entity initiated a business loan process in response to the offer.

Figure 2B:
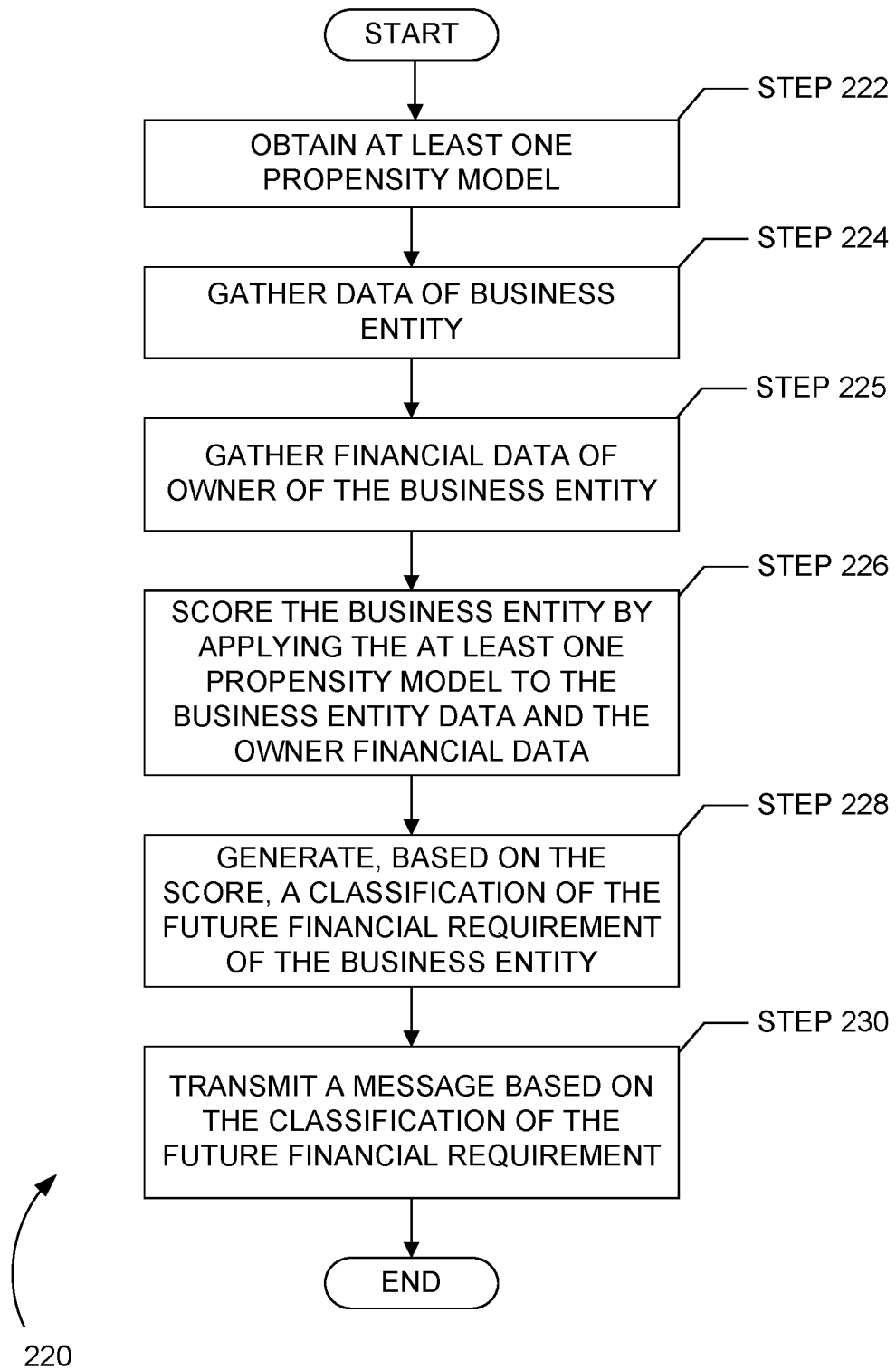

FIG. 2B depicts a flowchart of a method (220) of utilizing one or more propensity models to determine a future financial requirement, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2B. In one or more embodiments, the method (220) described in reference to FIG. 2B may be practiced using the system (100) described in reference to FIG. 1A and the system (110) described in reference to FIGS. 1B and 1C, above, and/or involving the computing system (500) described in reference to FIG. 5A

One or more propensity models are obtained at Step 222. Moreover, the one or more propensity models model how data associated with a business entity relates to a future financial requirement of the business entity. For example, the one or more propensity models may utilize a snapshot of a business entity and its owners at a current or prior time to determine that the business entity is likely to require a loan at some future point in time (e.g., in 3 months, 6 months, etc.). In one or more embodiments, the one or more propensity models obtained at Step 222 may have been generated according to the method (200) of FIG. 2A, described above. Of course, the one or more propensity models obtained at Step 222 may be generated by any other relevant method.

Next at Steps 224-225, data associated with a business entity is gathered. Specifically, at Step 224, data of a business entity is gathered. The data of the business entity includes a first portion of data that is created based on a platform utilized by the users associated with the business entity. In one or more embodiments, the platform may include a financial management platform that the business entity utilizes in furtherance of one or more business objectives. For example, the financial management platform may be utilized by users for invoicing, billing, payroll, accounts receivable, and/or tracking stock, etc. Accordingly, the first portion of the data associated with the business entity may include financial data and/or metadata.

Also, at Step 225, a second portion of data that includes financial data of at least one owner of the business entity is gathered. As described herein, the business entity may be owned by one or more individuals. Moreover, the financial data of an owner may include a credit report of the owner, a credit score of the owner, income information of the owner, asset information of the owner, information from a tax preparation or personal finance platform, information from public records, etc. Accordingly, the data associated with the business entity may include, the credit report, credit score, income information, tax filing information, personal finance information, and/or public records information for each of the one or more owners of the business entity. In one or more embodiments, only the financial data for owners having greater than a threshold ownership interest in the business entity may be gathered.

Still yet, the gathered data associated with the business entity matches at least a subset of the one or more propensity models. For example, if the one or more propensity models include a plurality of rules, where one of the rules is based on a geographic location of the business entity, and another of the rules is based on the annual income of the owner(s) of the business entity, then the data gathered at Steps 224-225 will include both the geographic location of the business entity and the annual income of the owner(s) of the business entity.

As used herein, gathering the data of the business entity includes any process that retrieves or receives the data of the business. For example, the data of the business entity may be retrieved over a computer network, such as the Internet. In one or more embodiments, the data of the business entity may be gathered from a data lake, such as the data lake (106) described in the context of the system (100) of FIG. 1A, or directly from a repository of user data, such as the account data (105) of the production environment (104) described in the context of the system (100) of FIG. 1A. Of course, however, the data of the business entity may be gathered from any relevant source.

Similarly, as used herein, gathering the financial data of an owner of the business entity includes any process that retrieves or receives financial or credit information of the owner. For example, the financial data of the owner of the business entity may be retrieved over a computer network, such as the Internet. In one or more embodiments, the financial data of the owner may be gathered from a data lake, such as the data lake (106) described in the context of the system (100) of FIG. 1A, a credit agency, public records (e.g., lawsuits, bankruptcy filings, etc.), tax filings, financial institutions, banking portals, etc. Of course, the financial data of the owner of the business entity may be gathered from any relevant source.

Next, at Step 226, the business entity is scored by applying the one or more propensity models to the data of the business entity and the financial data of the owner of the business entity. In one or more embodiments, the one or more propensity models include numerous rules. Moreover, the rules of the propensity models may be based on financial aspects of business entities, non-financial aspects of the business entities, and/or financial aspects of the owners of the business entities. As an option, each propensity model may be expressed as a mathematical formula, such that the application of the propensity model to the data associated with a business entity includes calculating a plurality of values and summing the values. For example, each rule of a propensity model may be associated with a coefficient, each of the coefficients may be multiplied by a '0' or a '1' based on the data associated with the business entity, and the products may be summed.

In one or more embodiments, a single propensity model may be applied to the data associated with the business entity. For example, a single propensity model may be applied to the data of the business entity and to the financial data of the owner(s) of the business entity. In such embodiments, a single sub-score may be generated that includes the summation of the products (obtained by multiplying the coefficients of the rules of the propensity model by a '0' or a '1' based on the data associated with the business entity). The single sub-score may be output by the single propensity model. The single sub-score may be a score of the business entity, or the single sub-score may be normalized or adjusted to arrive at the score of the business entity. For example, the single sub-score may be adjusted so that it is between 0 and 1, or another pre-determined range.

In one or more embodiments, where multiple propensity models are applied to the data associated with the business entity, a plurality of sub-scores may be generated, where each sub-score includes the summation of the products of a single propensity model (obtained by multiplying the coefficients of the rules of the propensity model by a '0' or a '1' based on the data associated with the business entity). For example, a first sub-score may include the summation of the products obtained during application of a first propensity model, and a second sub-score may include the summation of the products obtained during application of a second propensity model. The first sub-score may be obtained by applying the first propensity model to the data of the business entity, and the second sub-score may be obtained by applying the second propensity model to the financial data of the owner of the business entity. In such embodiments, two or more sub-scores from two or more corresponding propensity models may be aggregated by an aggregation model. One or more of the sub-scores may be weighted by the aggregation model. Moreover, the output of the aggregation model may be normalized or adjusted. For example, the output of the aggregation model may be adjusted so that it is between 0 and 1, or another pre-determined range.

Accordingly, the score of a business entity may be generated by applying one or more propensity models to data of the business entity and financial data of an owner of the business entity. As a result of applying the one or more propensity models, one or more sub-scores may be obtained. A single sub-score may represent the score of the business entity, or may be adjusted or normalized to obtain the score of the business entity; or a plurality of sub-scores may be combined and/or adjusted or normalized to obtain the score of the business entity.

Also, a classification of a future financial requirement of the business entity is generated, at Step 228, based on the score of the business entity. In one or more embodiments, for each of the business entities scored by applying the propensity model(s) to the data associated with the business entity, the business entity is classified based on its score.

For example, the business entities may be classified by dividing up the business entities into four quartiles. Those business entities classified in the highest 25% of scores may have the greatest likelihood of needing a loan. Conversely, those business entities classified in the lowest 25% of scores may be identified as having the least likelihood of needing a loan.

Still yet, at Step 230, a message is transmitted to the business entity. As described herein above, the message may include an email, a web page, or an advertisement. Accordingly, the transmission of the message includes any process of sending the message to the business entity in a targeted manner. As previously noted, the transmission may occur via a computer network and/or via physical correspondence.

In one or more embodiments a content of the message is based on the classification of the future financial requirement of the business entity. In other words, if the business entities are classified into quartiles based on their scores, then all business entities in the top quartile may be transmitted messages for the same, or a similar, offer. For example, all business entities classified in the top quartile may be offered business loans with interest rates between 3-7%. Similarly, all business entities classified in the second quartile may be offered business loans with interest rates between 5-9%.

Further, in one or more embodiments, the method of transmission is based on the classification of the future financial requirement of the business entity. For example, the messages transmitted to all business entities classified in the top quartile may be electronic messages (e.g., web page advertisements, emails, etc.), while the messages transmitted to all business entities classified in any of the other three quarters may be physical correspondence (e.g., postcards, direct mailings, etc.).

In this way, the business entities that are transmitted a message may be prioritized based on classification. This may ensure that those business entities determined to have the greatest financial need are contacted such that they can obtain the necessary financing in an efficient and timely manner, without risk of being forced into a high interest rate loan, or stunting the growth of their business.

Figure 3:
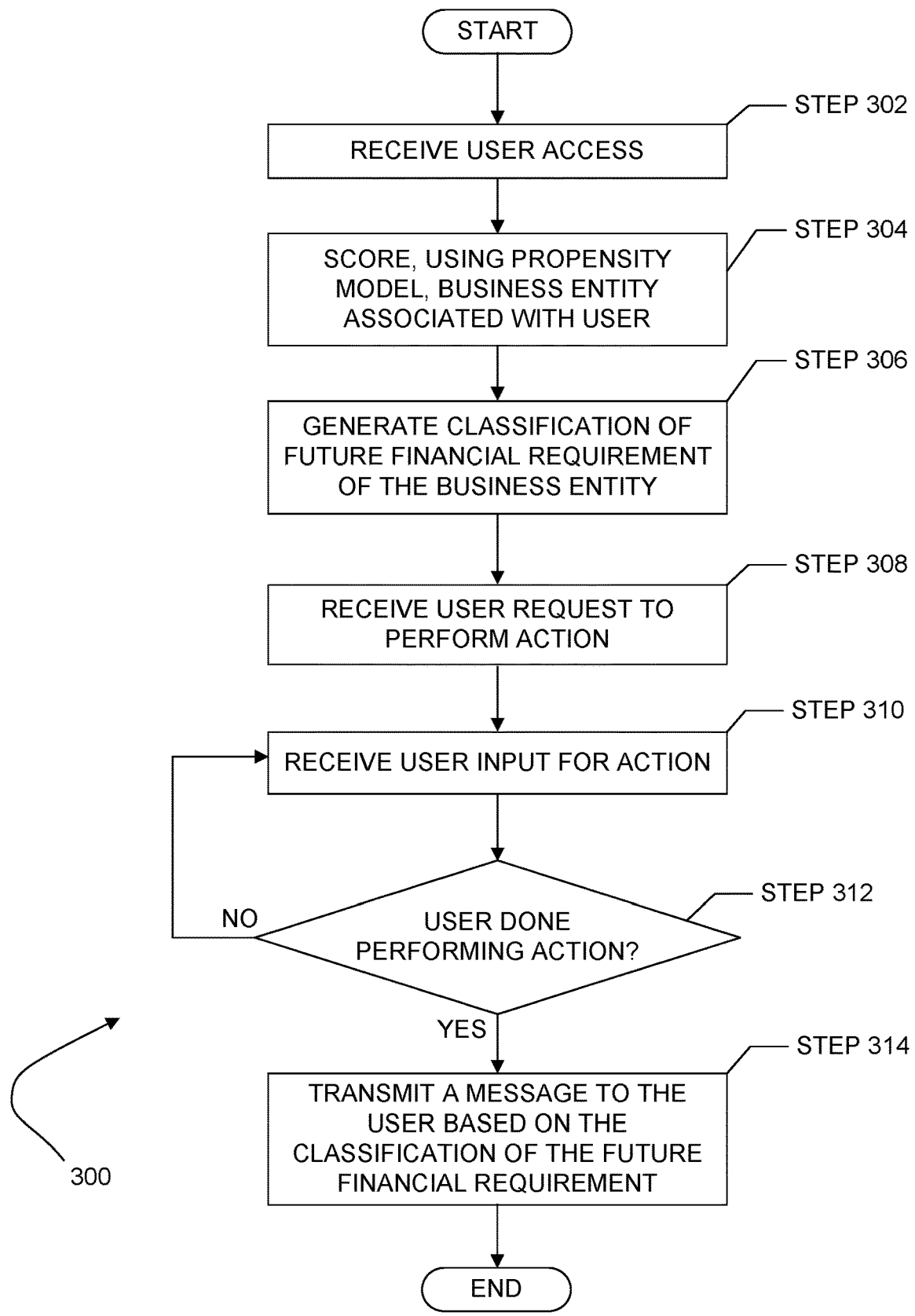
FIG. 3 illustrates a method of delaying the transmission of a message to a user of a business entity, in accordance with one or more embodiments of the invention.

FIG. 3 depicts a flowchart of a method (300) of delaying the transmission of a message to a user of a business entity, in accordance with one or more embodiments of the invention. In one or more embodiments, one or more of the steps shown in FIG. 3 may be omitted, repeated, and/or performed in a different order. Accordingly, embodiments of the invention should not be considered limited to the specific arrangements of steps shown in FIG. 3. In one or more embodiments, the method (300) described in reference to FIG. 3 may be practiced using the system (100) of FIG. 1A, the system (110) of FIGS. 1B and 1C, or the computing system (500) of FIG. 5A, and be based on the methods described with respect to FIGS. 2A-2B.

At Step 302, a user begins accessing a platform, such as, for example, a financial management platform. Moreover, the user is associated with a business entity. For example, the user may be the owner, manager, accountant of a business entity. As used herein, the access of the user includes any detectable user-based initiation to get, modify, or create data related to the business entity. For example, the access of the user may include the user logging in, waking from an idle state, etc.

Next, at Step 304, the business entity associated with the user is scored. The scoring of the business entity may proceed as described in the context of Step 226 of the method (220) of FIG. 2B. Also, at Step 306, a classification of a future financial requirement of the business entity is generated. In one or more embodiments, the generation of the classification may proceed as described in the context of Step 228 of the method (220) of FIG. 2B. Moreover, based on the generation of the classification, it is determined that the business entity of the user has a future financial need. For example, based on financial data and/or metadata stored on the platform on behalf of the business entity, and financial data of an owner of the business entity, it is determined that there is a strong probability the business entity will require a business loan in the next three months.

Additionally, at Step 308, a request is received from the user to perform an action. In one or more embodiments, the action may be any transaction-based business process. For example, the request from the user may include a request to enter invoices, close invoices, generate bills, enter payroll, track inventory, order stock, etc. In one or more embodiments, based on the user's request to perform the action, any transmission to the user, that is based on the classification of the future financial requirement of the business entity, may be delayed until the user has completed entering new data for the transactions.

Accordingly, at Step 310, the method (300) receives transaction data from the user, and, at Step 312, determines whether the user has finished entering transaction data. If the user has not finished entering transaction data, then the method (300) returns to Step 310, where additional transaction data is received from the user. In this way, the method (300) will continue to receive transaction data from the user until the user has finished entering transaction data.

For example, if, at Step 308, the user requests to enter invoices, then the method (300) will continue to allow the user to enter invoices until an indication is received from the user indicating that the user has finished. Similarly if, at Step 308, the user requests to enter payments that have been received, then the method (300) will continue to allow the user to enter payments until an indication is received from the user that the user has finished.

In one or more embodiments, the user may expressly indicate that he or she has finished entering transaction data. For example, the user may select a button or menu option indicating that he or she is finished. As another example, the user may save the transaction data, and attempt to exit the platform. As still yet another example, the user may return to a dashboard, or attempt to access another portion of the platform. More specifically, when the user has finished entering billing transaction data, the user may attempt to access payroll information. Accordingly, when the request is received that the user would like to access payroll, it may be determined, at Step 312, that the user has finished entering the transaction data and is done performing the action.

If, at Step 312 it is determined that the user has finished performing the action, the method (300) proceeds to Step 314, where a message is transmitted to the user based on the classification of the future financial requirement of the business entity, previously generated at Step 306. The transmission of the message at Step 314 may proceed as previously described in the context of Step 230 of FIG. 2B. In this manner, a business entity may be scored and identified as having a future financial requirement. However, rather than interrupt the workflow of the business entity, or its employees, the transmission of the message is temporarily delayed until the employees of the business entity are more likely to review the offer, and understand its applicability to their financial situation. For example, the employees of the business entity might better appreciate the need for a business loan after entering invoices, managing accounts receivable, running payroll, etc.

Figure 4A:
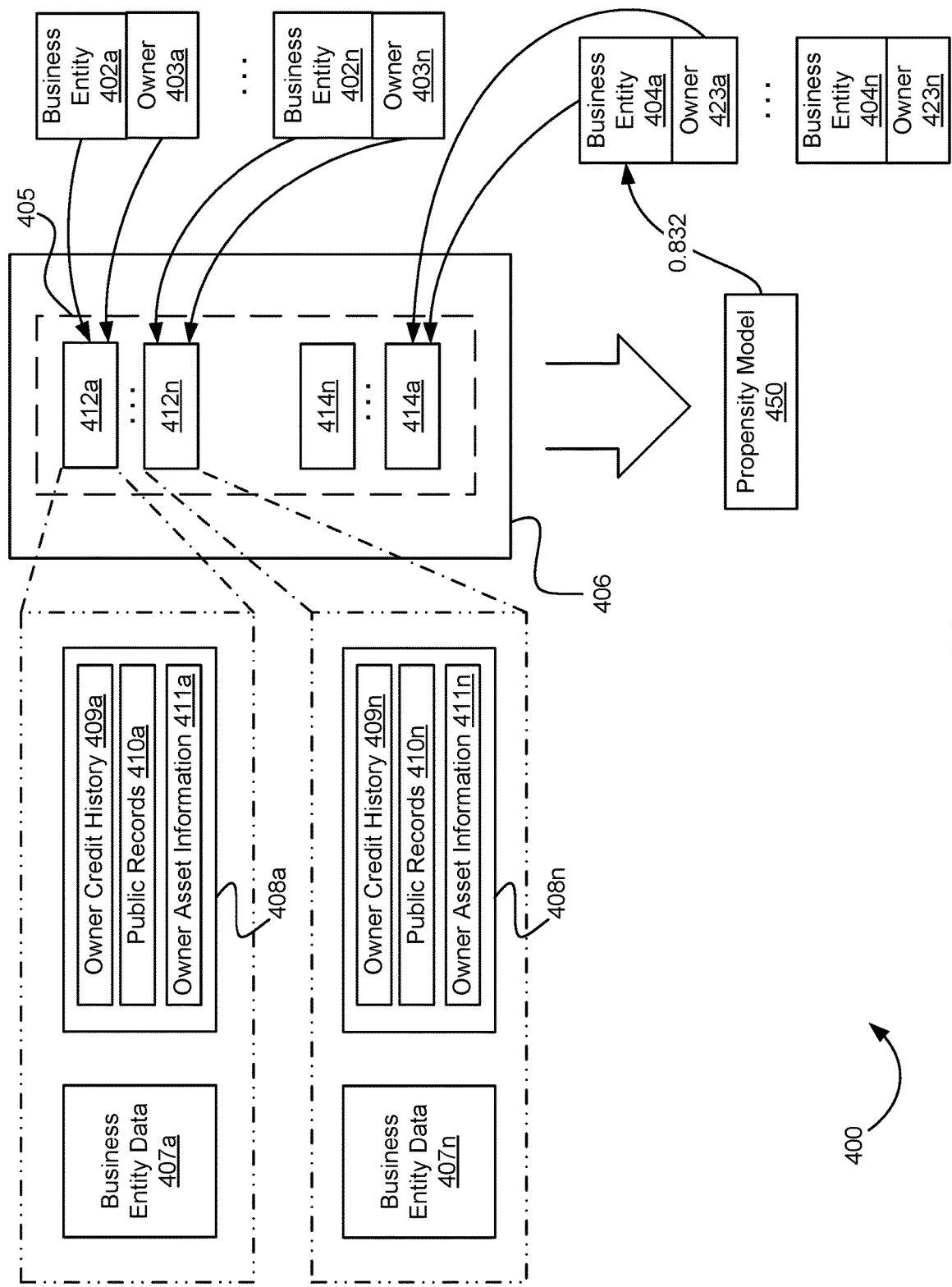
FIGS. 4A, 4B, and 4C illustrate the building and application of an externally augmented propensity model for determining a future financial requirement of a business entity, in accordance with one or more embodiments of the invention.
Figure 4B:
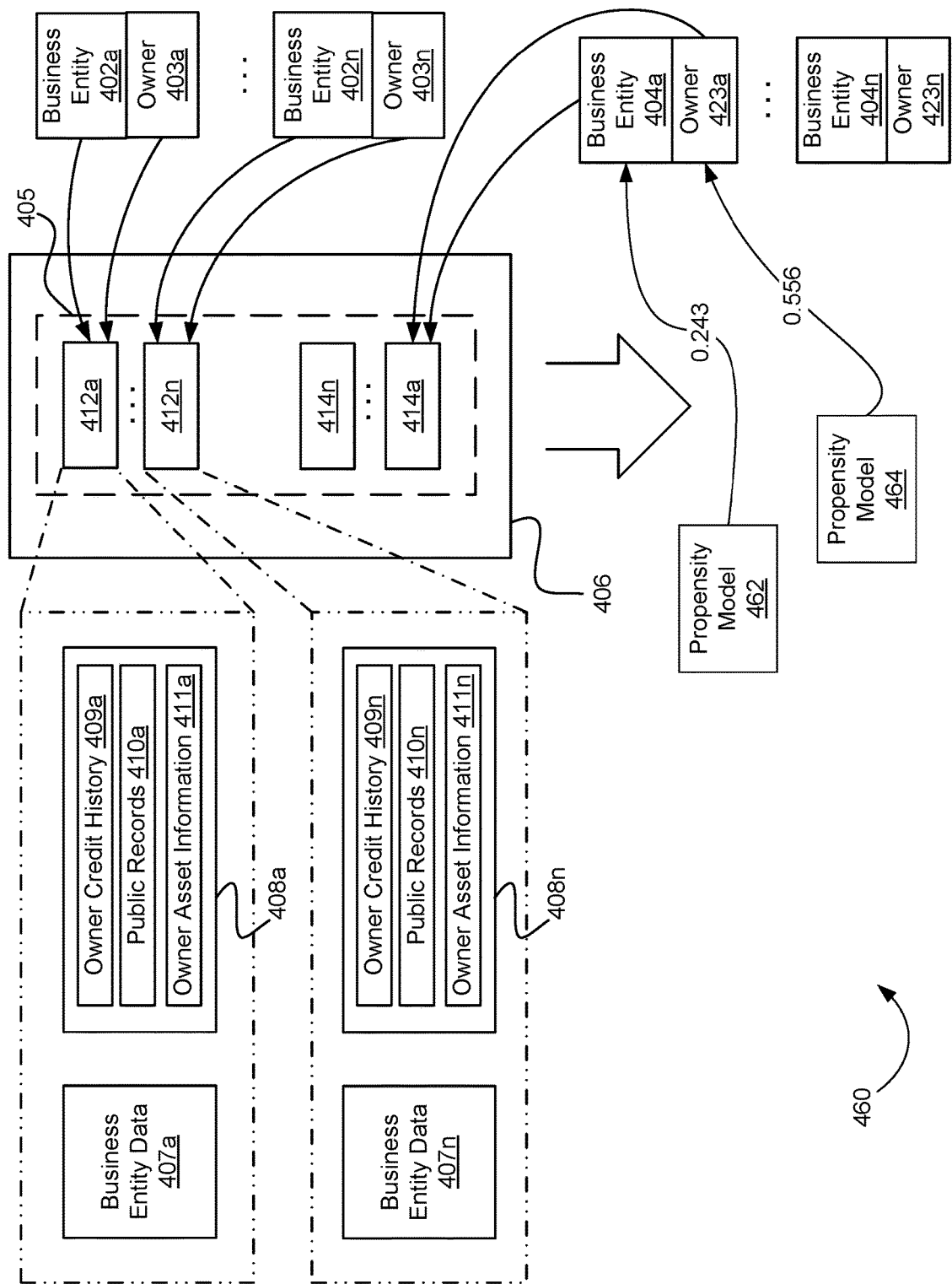
Figure 4C:
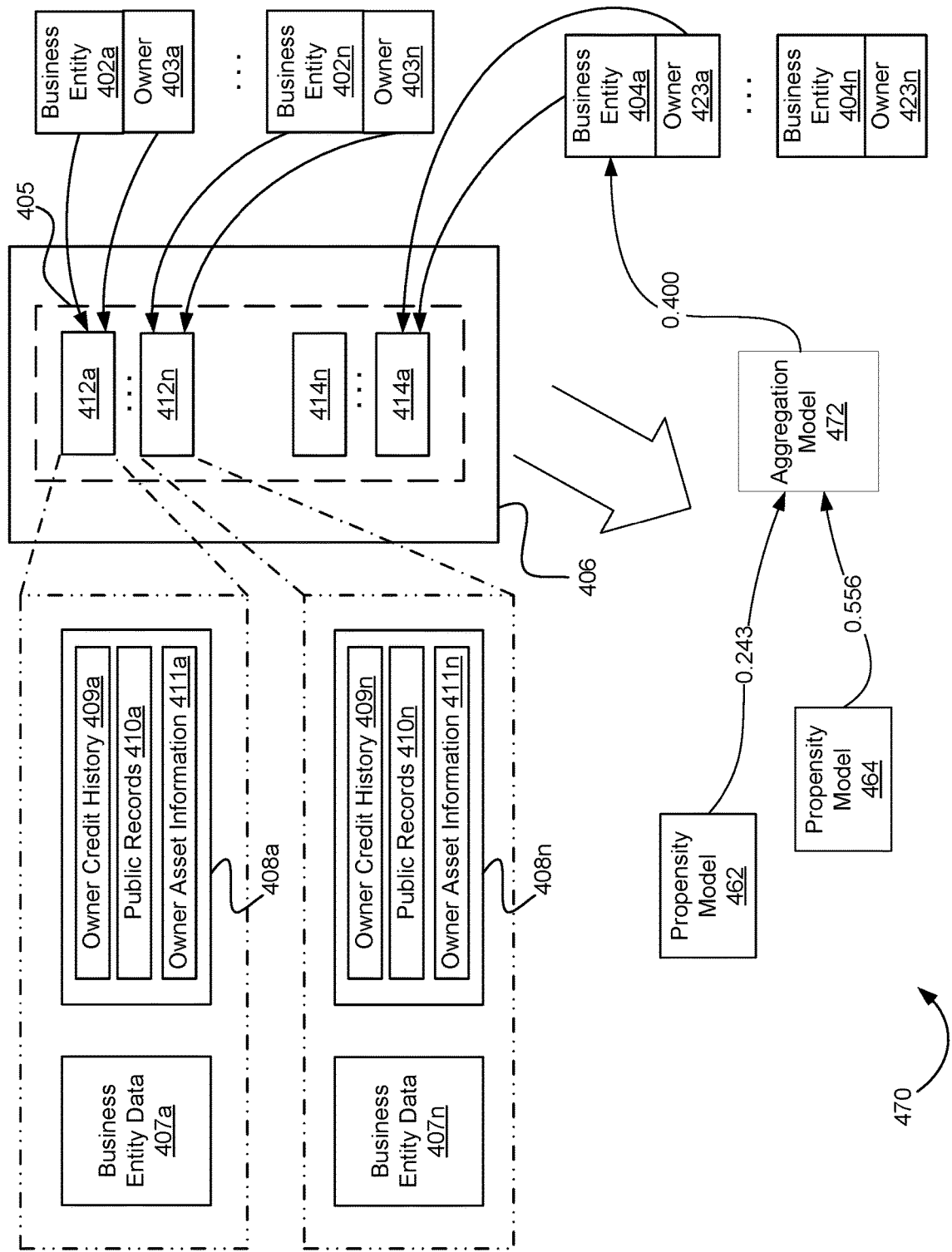

Referring now to FIGS. 4A, 4B, and 4C, systems (400, 460, 470) illustrate examples of the building and application of one or more externally augmented propensity models for determining a future financial requirement of a business entity, in accordance with one or more embodiments of the invention. The systems (400, 460, 470) may be practiced using the system (100) of FIG. 1A, the financial requirement prediction system (110) of FIGS. 1B and 1C, or the computing system (500) of FIG. 5A, and be based on the methods described with respect to FIGS. 2A and 2B as well as FIG. 3, above.

As described herein, the externally augmented propensity models include any propensity model that relies on information describing the financial situation of an individual or entity having an ownership interest in a given business entity, in order to determine a future financial requirement of the given business entity. Accordingly, an externally augmented propensity model may facilitate the assessment of a future financial requirement of a business entity utilizing information that is not directly attributable to the business entity.

As shown in FIG. 4A, the system (400) includes a first plurality of business entities (402), an owner (403) of each of the first plurality of business entities (402), a second plurality of business entities (404), an owner (423) of each of the second plurality of business entities (404), a financial management platform (406), and a propensity model (450). Moreover, the financial management platform (406) is shown to include account data (405). In one or more embodiments, the financial management platform (406) may include a platform for managing a business, such as Intuit QuickBooks. Still yet, the financial management platform may be hosted on a production environment, such as the production environment (104) described in the context of the system (100) of FIG. 1A.

The account data (405) is shown to include first data (412a) associated with a first business entity (402a) and an owner (403a) of the first business entity (402a), and second data (412n) associated with a second business entity (402n) and an owner (403n) of the second business entity (402n). For purposes of simplicity and clarity, the following description is limited to describing the data (412) associated with two business entities (402), however it is understood that the account data (405) may store data for hundreds, thousands, tens of thousands, or more business entities.

The first data (412a) associated with the first business entity (402a) includes first business entity data (407a) and first owner financial data (408a). In one or more embodiments, the first business entity data (407a) may include financial data and/or metadata associated with the first business entity (402a), as described hereinabove. The first business entity data (407a) may include a history of interaction of the first business entity (402a) with the financial management platform (406). For example, the first business entity data (407a) may identify a date that the first business entity (402a) began using the financial management platform (406), transaction records (e.g., sales records, purchase orders, etc.) of the first business entity (402a), a date when the first business entity (402a) received an actionable offer for a business loan, and a response of the first business entity (402a) to the actionable offer. In response to the offer for a business loan, the first business entity (402a) initiated a pre-determined process, by starting a corresponding loan application.

The first owner financial data (408a) is shown to include financial data of the owner (403a) of the first business entity (402a). More specifically, the first owner financial data (408a) includes a credit history (409a) of the owner (403a) of the first business entity (402a). For example, the credit history (409a) may include a credit score or credit report of the owner (403a) of the first business entity (402a). Also, the first owner financial data (408a) includes public records information (410a) regarding the owner (403a) of the first business entity (402a). For example, the public records information (410a) may include any bankruptcies of the owner (403a) of the first business entity (402a), liens against property owned by the owner (403a) of the first business entity (402a), lawsuits filed and/or judgments against the owner (403a) of the first business entity (402a), foreclosures on properties owned by the owner (403a) of the first business entity (402a), etc. Still yet, the first owner financial data (408a) includes asset information (411a) of the owner (403a) of the first business entity (402a). For example, the asset information (411a) may include real property, automobiles, investments, savings, cash, etc. that is held in the name of the owner (403a) of the first business entity (402a).

Similarly, the second data (412n) associated with the second business entity (402n) includes second business entity data (407n) and second owner financial data (408n). In one or more embodiments, the second business entity data (407n) may include financial data and/or metadata associated with the second business entity (402n), as described hereinabove. For example, the second business entity data (407n) may include a history of interaction of the second business entity (402n) with the financial management platform (406). For example, the second business entity data (407n) may identify a date that the second business entity (402n) began using the financial management platform (406), transaction records (e.g., sales records, purchase orders, etc.) of the second business entity (402n), a date when the second business entity (402n) received an actionable offer for a business loan, and a response of the second business entity (402n) to the actionable offer. Unlike the first business entity (402a), the second business entity (402n) did not take any action in response to the offer. For example, the second business entity (402n), did not start a loan application process in response to the offer, or further inquire with the lender regarding the details of the business loan being offered.

Also, the second owner financial data (408n) is shown to include financial data of the owner (403n) of the second business entity (402n). More specifically, the second owner financial data (408n) includes a credit history (409n) of the owner (403n) of the second business entity (402n). Also, the second owner financial data (408n) includes public records information (410n) regarding the owner (403n) of the second business entity (402n). Still yet, the second owner financial data (408n) includes asset information (411n) of the owner (403n) of the second business entity (402n).

In one or more embodiments, the propensity model (450) is built utilizing the data (412) associated with the various business entities (402), and how the respective business entities (402) responded to actionable offers for business loans. More specifically, the propensity model (450) is built utilizing the business entity data (407) and the owner financial data (408) of the various business entities (402), and how the respective business entities (402) responded to the actionable offers for business loans.

In particular, because the first business entity (402a) showed an interest in the offer for a business loan by starting a corresponding loan application, the first business entity (402a) and its owner (403a) are classified into a first population of business entities that have shown interest in actionable offers. However, because the second business entity (402n) did not show any interest in the offer for a business loan, the second business entity (402n) and its owner (403n) are classified into a second, different, population of business entities that have not shown interest in actionable offers.

Next, for each of the business entities (402) in one of the first or second populations, the data of the business entity (402) and financial data of the owner (403) of the business entity (402) is reconstructed to create a snapshot of the business entity and the owner's financial circumstances at a pre-determined time prior to when the business entity received its respective actionable offer.

For example, the first business entity data (407a) and owner financial data (408a) of the first data (412a) may be reconstructed to generate a snapshot representative of the first business entity (402a) and the financial circumstances of the owner (403a) of the first business entity (402a) at a date three months prior to when the first business entity (402a) received the actionable offer. Similarly, the second business entity data (407n) and owner financial data (408n) of the second data (412n) may be reconstructed to generate a snapshot representative of the second business entity (402n) and the financial circumstances of the owner (403n) of the second business entity (402n) at a date three months prior to when the second business entity (402n) received the actionable offer. Accordingly, the reconstructed data associated with each of the business entities (402) may include business entity financial data, business entity metadata, and/or owner financial data that is representative of a state of the business entity and its owner before its respective cutoff date.

The propensity model (450) is built using the reconstructed data of the relevant business entities (402). In particular, the propensity model (450) is built to include numerous rules that, in combination, can be used to score others business entities (404), where each score is representative of a future financial need of the respective business entity (404). Specifically, the propensity model (450) includes the three rules set forth in Table 1. Each of the three rules of Table 1 is defined by one or more conditions. Also, each of the three rules of Table 1 is associated with a corresponding support value, coefficient, and importance value.

TABLE 1

| Rule | Support | Coefficient | Importance | Definition |
|---|---|---|---|---|
| 1 | 0.427 | −0.656 | 100.0 | YOY_SALES_GROWTH <= 0.1525 & OWNER_CREDIT_SCORE > 740 |
| 2 | 0.073 | 0.643 | 83.1 | FIRST_CHARGE_DATE <= 110 & OWNER_ASSETS_VALUED > 100000 & OWNER_ASSETS_VALUED < 300000 |
| 3 | 0.522 | 0.189 | 81.6 | ANNUAL_SALES_REVENUE >= 60925 & ANNUAL_SALES_REVENUE > 3000000 & LIENS_AGAINST_OWNER = 0 |

As illustrated by the rules of Table 1, the propensity model (450) includes one or more rules, each of which may include a condition directed to data of a business entity as well as financial data of the owner of the business entity. In other words, a single propensity model (450) may be applied to both the data of a business entity and the financial data of the owner of the business entity.

When applying the propensity model (450) to the data associated with a given business entity, the data associated with the business entity is tested against the various rules defined by the propensity model (450). For example, as illustrated by Table 1, the first rule of the propensity model (450) is defined by two conditions. Specifically, the first rule of the propensity model (450) includes a condition based on a year-over-year sales growth (i.e., YOY_SALES_GROWTH) of the business entity, and a condition based on a credit score of the owner of the business entity (i.e., OWNER_CREDIT_SCORE). The second rule of the propensity model (450) is defined by three conditions. Specifically, the second rule of the propensity model (450) includes a condition based on the first charge date (i.e., FIRST_CHARGE_DATE) of the business entity, and two conditions based on a value of assets held by the owner of the business entity (i.e., OWNER_ASSETS_VALUED). The third rule of the propensity model (450) is also defined by three conditions. Specifically, the third rule of the propensity model (450) includes two conditions based on an annual sales revenue of the business entity (i.e., ANNUAL_SALES_REVENUE), and a condition based on a number of liens found to exist against the owner of the business entity (i.e., LIENS_AGAINST_OWNER).

As noted above, a first charge date includes a past point in time that is identified as the beginning of a business relationship with the business entity, such as, for example, when the business entity began using the financial management platform (406).

As illustrated by FIG. 4A, the propensity model (450) is applied to the data (414) associated with other business entities (404) to predict a future financial requirement of the other business entities (404). Moreover, each instance of the data (414) associated with the other business entities (404) may include business entity data of the respective business entity (404), as well as financial data of the owner (423) of the corresponding business entity (404). Accordingly, the propensity model (450) is applied to third data (414a) associated with a third business entity (404a) to determine a future financial requirement of the third business entity (404a). The third data (414a) includes business entity data of the third business entity (404a) and financial data of the owner (423a) of the third business entity (404a).

In the present example, it is determined, from business entity data of the third business entity (404a), that the third business entity (404a) has sold $208,000 worth of product this year, which accounts for a 17% year-over-year sales growth; and that the third business entity (404a) has a first charge date of 91 days ago. Also, it is determined, from financial data of the owner (423a) of the third business entity (404a), that the owner (423a) has a credit score of 810, holds assets worth $275,000, and there are no liens against any property of the owner (423a).

Thus, although the credit score of 810 of the owner (423a) meets the credit score condition of rule 1 (i.e., OWNER_CREDIT_SCORE>740), the 17% year-over-year sales growth of the business entity (404a) does not meet the <=15.25% year-over-year sales growth condition of rule 1. Accordingly, a value of 0 is multiplied by the coefficient of rule 1, −0.656. Also, because the first charge date of 91 days of the third business entity (404a) meets the first charge date condition of rule 2, and the $275,000 valuation of the assets of the owner (423a) meets the owner assets conditions of rule 2, a value of 1 is multiplied by the coefficient of rule 2, 0.643. Similarly, because the annual sales revenue of $208,000 of the third business entity (404a) meets the annual sales revenue conditions of rule 3, and the lack of liens against property held by the owner (423a) meets the liens against owner condition of rule 3, a value of 1 is multiplied by the coefficient of rule 3, 0.189. Further, each of these products is added together to arrive at a sum of 0.832 (0+0.643+0.189).

In one or more embodiments, the scores of the business entities (404) may include the respective sums. For example, the score of the third business entity (404a) may include the sum of 0.832. In one or more embodiments, the sums of the business entities (404) may be normalized, or otherwise adjusted, to arrive at the respective scores of the business entities (404). For example, if one or more sums falls outside of a range from 0-1, the sums of the business entities (404) may be coordinately adjusted to arrive at a respective score between 0-1. In other words, the score of the third business entity (404a) may be adjusted upwards or downwards based on a normalization operation. For example, the score of the third business entity (404a) may be adjusted upwards or downwards based on the other scores of other business entities (404) calculated by applying the propensity model (450) to the data of the other business entities (404), and the owners (423) of the other business entities (404).

As shown in FIG. 4B, the system (460) is substantially similar to the system (400) of FIG. 4A. In particular, the system (460) includes a first plurality of business entities (402), an owner (403) of each of the first plurality of business entities (402), a second plurality of business entities (404), an owner (423) of each of the second plurality of business entities (404), and a financial management platform (406). Also, the financial management platform (406) is shown to include account data (405).

However, unlike the system (400), the system (460) includes a first propensity model (462) and a second propensity model (464). In one or more embodiments, the first propensity model (462) is built utilizing the business entity data (407) of the various business entities (402), and how the respective business entities (402) responded to actionable offers for business loans; and the second propensity model (464) is built utilizing the financial data (408) of the business owners (403), and how the respective business entities (402) responded to the actionable offers for business loans.

As previously noted, because the first business entity (402a) showed an interest in the offer for a business loan by starting a corresponding loan application, the first business entity (402a) is classified into a first population of business entities that have shown interest in actionable offers. However, because the second business entity (402n) did not show any interest in the offer for a business loan, the second business entity (402n) is classified into a second, different, population of business entities that have not shown interest in actionable offers. Similarly, because the first business entity (402a) showed an interest in the offer for a business loan, the owner (403a) of the first business entity (402a) is classified into a first population of business owners, while the owner (403n) of the second business entity (402n) is classified into a second population of business owners.

For each of the business entities (402) in one of the first or second populations, the data (407) of the business entity (402) is reconstructed to create a snapshot of the business entity (402) at a pre-determined time prior to when the business entity (402) received its actionable offer. Similarly, for each of the owners (403) in one of the first or second populations, the financial data (408) of the owner (403) is reconstructed to create a snapshot of the owner's financial circumstances at the pre-determined time prior to when the business entity (402) received its respective actionable offer. Using the two populations of business entities (402), the first propensity model (462) may be generated. Similarly, using the two populations of business owners (403), the second propensity model (464) may be generated.

Thus, the propensity models (462 and 464) are built using the reconstructed data of the relevant business entities (402), and, respectively, the corresponding business owners (403). In this way, the propensity model (462) is built to include numerous rules that can be used to score the data of other business entities (404), and the propensity model (464) is built to include numerous rules that can be used to score the owners (423) of the other business entities (404).

For illustration, the first propensity model (462) includes the two rules set forth in Table 2. Each of the two rules of Table 2 is defined by one or more conditions. Also, each of the rules of Table 2 is associated with a corresponding support value, coefficient, and importance value.

TABLE 2

| Rule | Support | Coefficient | Importance | Definition |
|---|---|---|---|---|
| 1 | 0.317 | 0.856 | 99.0 | YOY_SALES_GROWTH <= 0.1525 & ANNUAL_SALES_REVENUE >= 60925 |
| 2 | 0.063 | 0.243 | 93.1 | FIRST_CHARGE_DATE <= 110 & NUMBER_EMPLOYEES > 4 |

For illustration, the second propensity model (464) includes the two rules set forth in Table 3. Each of the two rules of Table 3 is defined by one or more conditions. Also, each of the rules of Table 3 is associated with a corresponding support value, coefficient, and importance value.

TABLE 3

| Rule | Support | Coefficient | Importance | Definition |
|---|---|---|---|---|
| 1 | 0.617 | 0.556 | 99.5 | OWNER_CREDIT_SCORE > 740 & OWNER_ASSETS_VALUED > 100000 |
| 2 | 0.363 | 0.443 | 87.5 | OWNER_HOME_EQUITY > 300000 |

As illustrated by the rules of Tables 2 and 3, the first propensity model (462) includes rules that include one or more conditions directed to data of a business entity, and the second propensity model (464) includes rules that include one or more conditions directed to financial data of an owner of a business entity.

The first rule of the first propensity model (462) is defined by two conditions. Specifically, the first rule of the first propensity model (462) includes a condition based on a year-over-year sales growth (i.e., YOY_SALES_GROWTH) of the business entity, and a condition based on an annual sales revenue of the business entity (i.e., ANNUAL_SALES_REVENUE). The second rule of the first propensity model (462) is defined by two conditions. Specifically, the second rule of the first propensity model (462) includes a condition based on the first charge date (i.e., FIRST_CHARGE_DATE) of the business entity, and a number of employees of the business entity (i.e., NUMBER_EMPLOYEES).

As illustrated by Table 3, the second propensity model (464) includes rules that include one or more conditions directed to the financial data of an owner of a business entity. The first rule of the second propensity model (464) is defined by two conditions. Specifically, the first rule of the second propensity model (464) includes a condition based on a credit score of the owner of the business entity (i.e., OWNER_CREDIT_SCORE), and a condition based on a value of assets held by the owner of the business entity (i.e., OWNER_ASSETS_VALUED). The second rule of the second propensity model (464) is defined by a single condition. Specifically, the second rule of the second propensity model (464) includes a condition based on a value of home equity built by the owner of the business entity (i.e., OWNER_HOME_EQUITY).

As illustrated by FIG. 4B, the first propensity model (462) is used to generate a corresponding first sub-score for each of the other business entities (404), and the second propensity model (464) is used to generate a corresponding second sub-score for each of the owners (423) of the other business entities (404).

For example, the first propensity model (462) is applied to the third data (414a) associated with a third business entity (404a) to determine a future financial requirement of the third business entity (404a). The third data (414a) includes business entity data of the third business entity (404a) and financial data of the owner (423a) of the third business entity (404a). A first sub-score may be calculated by applying the first propensity model (462) to the business entity data of the third business entity (404a), and a second sub-score may be calculated by applying the second propensity model (464) to the financial data of the owner (423a) of the third business entity (404a).

In the present example, it is determined, from business entity data of the third business entity (404a), that the third business entity (404a) has sold $208,000 worth of product this year, which accounts for a 17% year-over-year sales growth; that the third business entity (404a) has a first charge date of 91 days ago, and that the third business entity (404a) currently has six employees on payroll. Also, it is determined, from financial data of the owner (423a) of the third business entity (404a), that the owner (423a) has a credit score of 810, holds assets worth $275,000, and has built up $200,000 of home equity.

Thus, although the annual sales revenue of the third business entity (404a) meets the annual sales revenue condition of rule 1 of the first propensity model (462) (i.e., ANNUAL_SALES_REVENUE>=60925), the 17% year-over-year sales growth of the business entity (404a) does not meet the <=15.25% year-over-year sales growth condition of rule 1 of the first propensity model (462). Accordingly, a value of 0 is multiplied by the coefficient of rule 1 of the first propensity model (462), 0.856. Also, because the first charge date of 91 days of the third business entity (404a) meets the first charge date condition of rule 2 of the first propensity model (462), and the six employees on payroll of the third business entity (404a) meets the number of employees condition of rule 2 of the first propensity model (462), a value of 1 is multiplied by the coefficient of rule 2 of the first propensity model (462), 0.243. Further, each of these products is added together to arrive at a sum, or first sub-score, of 0.243 (0+0.243).

In addition, the 810 credit score of the owner (423a) of the third business entity (404a) meets the minimum credit score condition of rule 1 of the second propensity model (464) (i.e., OWNER_CREDIT_SCORE>740), and the $275,000 in assets of the owner (423a) of the third business entity (404a) meets the $100,000 minimum asset value condition of rule 1 of the second propensity model (464). Accordingly, a value of 1 is multiplied by the coefficient of rule 1 of the second propensity model (464), 0.556. Also, because the $200,000 of home equity of the owner (423a) of the third business entity (404a) does not meet the minimum home equity condition of rule 2 of the second propensity model (464), a value of 0 is multiplied by the coefficient of rule 2 of the second propensity model (464), 0.443. Further, each of these products is added together to arrive at a sum, or second sub-score, of 0.556 (0.556+0).

In one or more embodiments, the first sub-score and the second sub-score may be may be selected for scoring the third business entity (404a) and the owner (423a) of the third business entity (404a), respectively. Accordingly, the third business entity (404a) and the owner (423a) of the third business entity (404a) may be scored separately. In one or more embodiments, one of the first sub-score and the second sub-score may be may be selected for scoring the third business entity (404a), and the other sub-score(s) discarded. For example, a minimum, maximum, median sub-score may be used for scoring the business entity (404a). As an option, selected sub-scores may be normalized or otherwise adjusted, as described hereinabove, to arrive at the final scores of the business entities (404). For example, if the first sub-score (0.243) is selected for scoring the third business entity (404a), the selected sub-score may be normalized or adjusted based on the range of values of other sub-scores output by the first propensity model (462) for other business entities (404).

In one or more embodiments, the sub-scores may be manipulated by an aggregation model. For example, referring to FIG. 4C, an aggregation model (472) has been implemented in the system (470), which may be otherwise identical to the system (460) of FIG. 4B. In this manner, the first propensity model (462) and the second propensity model (464) may be sub-models to the aggregation model (472).

In one or more embodiments, the aggregation model (472) may receive as input two or more sub-scores for a business entity (404), perform one or more mathematical operations on the input sub-scores, and output a score for the business entity (404). For example, the input sub-scores may be summed, multiplied, averaged, etc. As an option, one or more of the sub-scores may be weighted. For example, the aggregation model (472) may weight the first sub-score of the first propensity model (462) at 80% contribution, and the second sub-score of the second propensity model (464) at 20% contribution.

As illustrated in FIG. 4C, the first sub-score of 0.243 and the second sub-score of 0.556 have been averaged by the aggregation model (472), which outputs a score of 0.400 for the third business entity (404a). As an option, the score of 0.400 for the third business entity (404a) may be normalized or otherwise adjusted. For example, as noted above, the scores of the business entities (404) output by the aggregation model (472) may be coordinately adjusted to ensure that all scores for the business entities (404) are within a given range, such as, for example, between 0 and 1, between 1 and 100, etc.

Moreover, based on the scores generated by the models (450, 462, 464, 472) for the business entities (404), one or more of the business entities (404) may be classified as likely to need a loan. For example, based on its score, the third business entity (404a) may be classified as in great need of a loan, in moderate need of a loan, or without immediate need for a loan.

Based on each of these classifications, each of the business entities (404) may be transmitted a message offering to help with the respective business entity's future financial requirement. For example, a given one of the business entities (404) may receive a targeted email or electronic advertisements based on its great need for a loan product, while another one of the business entities (404) may receive a targeted postcard or other direct mailing based on its moderate need for a loan product.

In this manner, businesses that are most in need of financing may be identified based on financial data and metadata of the businesses, as well as financial data of the owners of the businesses. Moreover, by identifying business trends utilizing propensity models, the businesses may be targeted with compelling financing offers before they find themselves in an inconvenient or detrimental position. For example, by identifying the financial need of a business entity long before the owner of the business entity has realized the need, and by providing an enticing offer, the owner may begin early the process of applying for a low interest rate business loan, and avoid the pitfalls of a fast funding but higher interest rate or short-term loan.

Figure 5A:
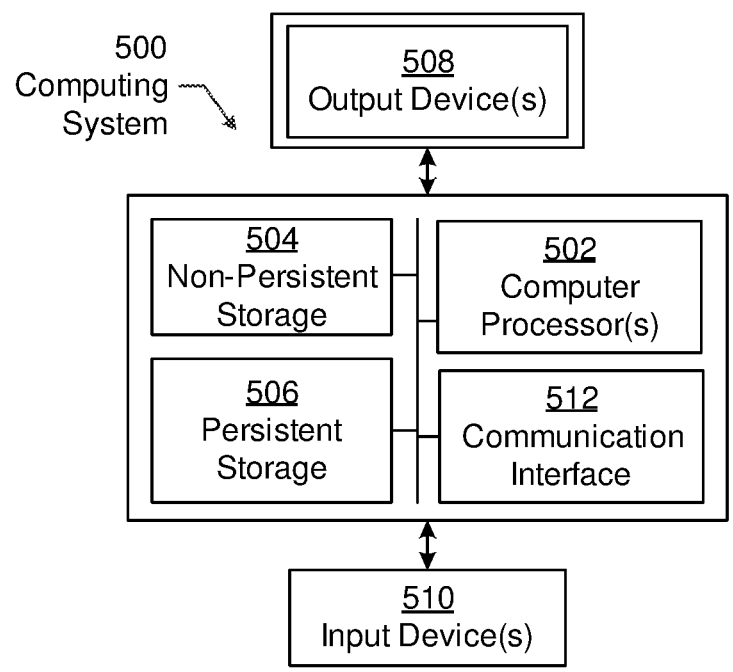
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
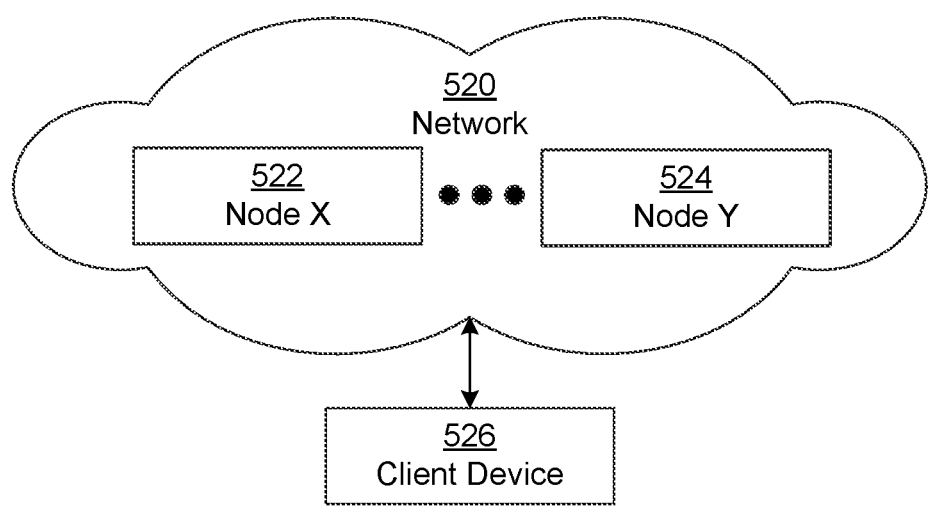
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining, by a computer processor of a modeling system, at least one propensity model,
wherein each propensity model of the at least one propensity model models how data associated with a business entity relates to a future financial requirement of the business entity,
wherein the at least one propensity model includes a first propensity model, a second propensity model, and a third propensity model, and
wherein the first propensity model, the second propensity model, and the third propensity model each comprise a machine learning model trained using reconstructed data of a plurality of business entities;
reconstructing, for the second propensity model, data of the plurality of business entities to include financial data of a majority owner of the respective business entity and exclude financial data of a minority owner of the respective business entity based on the minority owner having a minority ownership interest in the respective business entity, the majority owner having a majority ownership interest in the respective business entity;
reconstructing, for the third propensity model, the data of the plurality of business entities to include financial data of the minority owner of the respective business entity and exclude the financial data of the majority owner of the respective business entity;
training the respective machine learning model by applying a rules ensemble method to transactions in business entity data of the plurality of business entities prior to a specified date by
generating different rules, testing the different rules against the transactions in the business entity data, and then ranking the different rules as determined by logistic regression;
gathering, via a network, by the computer processor of the modeling system, and from a platform utilized by a user associated with the business entity, the data associated with the business entity by matching the data associated with the business entity to a rule of the at least one propensity model, wherein the data includes:
a first portion of the data that is created based on the platform utilized by users associated with the business entity,
a second portion of the data that includes financial data of a majority owner of the business entity, and
a third portion of the data that includes financial data of a minority owner of the business entity;
scoring, by the computer processor of the modeling system, the business entity by:
applying the first propensity model to the first portion of the data to generate a first sub-score,
applying the second propensity model to the second portion of the data to generate a second sub-score,
applying the third propensity model to the third portion of the data to generate a third sub-score, and
aggregating the first sub-score, the second sub-score, and the third sub-score to generate a score of the business entity;
generating, by the computer processor of the modeling system and based on the score of the business entity, a classification of the future financial requirement of the business entity; and
transmitting, via the network and by a message transmission module, a message to the business entity based on the classification of the future financial requirement of the business entity.

2. The method of claim 1, wherein the financial data of the majority owner of the business entity includes a credit score of the majority owner of the business entity.

3. The method of claim 1, wherein the financial data of the majority owner of the business entity includes income information of the majority owner of the business entity.

4. The method of claim 1, wherein the financial data of the majority owner of the business entity includes tax information of the majority owner of the business entity.

5. The method of claim 1, wherein the financial data of the majority owner of the business entity includes a history of judgments against the majority owner of the business entity.

6. The method of claim 1, wherein the financial data of the majority owner of the business entity includes asset information of the majority owner of the business entity.

7. A system, comprising:
a hardware processor and memory; and
software instructions stored in the memory and configured to execute on the hardware processor, which, when executed by the hardware processor, cause the hardware processor to:
obtain, by a computer processor of a modeling system, at least one propensity model,
wherein each propensity model of the at least one propensity model models how data associated with a business entity relates to a future financial requirement of the business entity,
wherein the at least one propensity model includes a first propensity model a second propensity model, and a third propensity model, and
wherein the first propensity model, the second propensity model, and the third propensity model each comprise a machine learning model trained using reconstructed data of a plurality of business entities;
reconstruct, for the second propensity model, data of the plurality of business entities to include financial data of a majority owner of the respective business entity and exclude financial data of a minority owner of the respective business entity based on the minority owner having a minority ownership interest in the respective business entity, the majority owner having a majority ownership interest in the respective business entity;
reconstruct, for the third propensity model, the data of the plurality of business entities to include financial data of the minority owner of the respective business entity and exclude the financial data of the majority owner of the respective business entity;
train the respective machine learning model by applying a rules ensemble method to transactions in business entity data of the plurality of business entities prior to a specified date by
generating different rules, testing the different rules against the transactions in the business entity data, and then ranking the different rules as determined by logistic regression;
gather, via a network, by the computer processor of the modeling system, and from a platform utilized by a user associated with the business entity, the data associated with the business entity by matching the data associated with the business entity to a rule of the at least one propensity model, wherein the data includes:
a first portion of the data that is created based on the platform utilized by users associated with the business entity,
a second portion of the data that includes financial data of a majority owner of the business entity, and
a third portion of the data that includes financial data of a minority owner of the business entity;
score, by the computer processor of the modeling system, the business entity by:
applying the first propensity model to the first portion of the data to generate a first sub-score,
applying the second propensity model to the second portion of the data to generate a second sub-score,
applying the third propensity model to the third portion of the data to generate a third sub-score, and
aggregating the first sub-score, the second sub-score, and the third sub-score to generate a score of the business entity;

generate, by the computer processor of the modeling system and based on the score of the business entity, a classification of the future financial requirement of the business entity; and transmit, via the network and by a message transmission module, a message to the business entity based on the classification of the future financial requirement of the business entity.

8. The system of claim 7, wherein the financial data of the majority owner of the business entity includes a credit score of the majority owner of the business entity.

9. The system of claim 7, wherein the financial data of the majority owner of the business entity includes income information of the majority owner of the business entity.

10. The system of claim 7, wherein the financial data of the majority owner of the business entity includes tax information of the majority owner of the business entity.

11. The system of claim 7, wherein the financial data of the majority owner of the business entity includes a history of judgments against the majority owner of the business entity.

12. The system of claim 7, wherein the financial data of the majority owner of the business entity includes asset information of the majority owner of the business entity.

13. A non-transitory computer readable medium storing instructions, the instructions, when executed by a computer processor, comprising functionality for:

obtaining, by a computer processor of a modeling system, at least one propensity model,
wherein each propensity model of the at least one propensity model models how data associated with a business entity relates to a future financial requirement of the business entity,
wherein the at least one propensity model includes a first propensity model, a second propensity model, and a third propensity model, and
wherein the first propensity model, the second propensity model, and the third propensity model each comprise a machine learning model trained using reconstructed data of a plurality of business entities, reconstructing, for the second propensity model, data of the plurality of business entities to include financial data of a majority owner of the respective business entity and exclude financial data of a minority owner of the respective business entity based on the minority owner having a minority ownership interest in the respective business entity, the majority owner having a majority ownership interest in the respective business entity;

reconstructing, for the third propensity model, the data of the plurality of business entities to include financial data of the minority owner of the respective business entity and exclude the financial data of the majority owner of the respective business entity;

training the respective machine learning model by applying a rules ensemble method to transactions in business entity data of the plurality of business entities prior to a specified date by generating different rules, testing the different rules against the transactions in the business entity data, and then ranking the different rules as determined by logistic regression;

gathering, via a network, by the computer processor of the modeling system, and from a platform utilized by a user associated with the business entity, the data associated with the business entity by matching the data associated with the business entity to a rule of the at least one propensity model, wherein the data includes:
a first portion of the data that is created based on the platform utilized by users associated with the business entity,
a second portion of the data that includes financial data of a majority owner of the business entity, and
a third portion of the data that includes financial data of a minority owner of the business entity;

scoring, by the computer processor of the modeling system, the business entity by:
applying the first propensity model to the first portion of the data to generate a first sub-score,
applying the second propensity model to the second portion of the data to generate a second sub-score,
applying the third propensity model to the third portion of the data to generate a third sub-score, and
aggregating the first sub-score, the second sub-score, and the third sub-score to generate a score of the business entity;

generating, by the computer processor of the modeling system and based on the score of the business entity, a classification of the future financial requirement of the business entity; and transmitting, via the network and by a message transmission module, a message to the business entity based on the classification of the future financial requirement of the business entity.

14. The non-transitory computer readable medium of claim 13, wherein the financial data of the majority owner of the business entity includes a credit score of the majority owner of the business entity.

15. The non-transitory computer readable medium of claim 13, wherein the financial data of the majority owner of the business entity includes income information of the majority owner of the business entity.

16. The non-transitory computer readable medium of claim 13, wherein the financial data of the majority owner of the business entity includes tax information of the majority owner of the business entity.

17. The non-transitory computer readable medium of claim 13, wherein the financial data of the majority owner of the business entity includes a history of judgments against the majority owner of the business entity.

18. The non-transitory computer readable medium of claim 13, wherein the financial data of the majority owner of the business entity includes asset information of the majority owner of the business entity.

* * * * *